United States Patent
Huang et al.

(10) Patent No.: US 11,456,822 B2
(45) Date of Patent: *Sep. 27, 2022

(54) METHOD AND APPARATUS FOR PROVIDING CONTROL RESOURCE SET CONFIGURATION IN A WIRELESS COMMUNICATION SYSTEM

(71) Applicant: ASUSTek Computer Inc., Taipei (TW)

(72) Inventors: Chun-Wei Huang, Taipei (TW);
Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 131 days.

This patent is subject to a terminal disclaimer.

(21) Appl. No.: 17/124,487

(22) Filed: Dec. 16, 2020

(65) Prior Publication Data
US 2021/0105095 A1 Apr. 8, 2021

Related U.S. Application Data

(63) Continuation of application No. 16/241,368, filed on Jan. 7, 2019, now Pat. No. 10,951,359.

(60) Provisional application No. 62/619,041, filed on Jan. 18, 2018.

(51) Int. Cl.
*H04W 4/00* (2018.01)
*H04L 1/16* (2006.01)
*H04W 72/04* (2009.01)
*H04L 5/00* (2006.01)

(52) U.S. Cl.
CPC .......... *H04L 1/1614* (2013.01); *H04L 5/0053* (2013.01); *H04L 5/0094* (2013.01); *H04W 72/042* (2013.01); *H04W 72/0446* (2013.01); *H04L 5/0007* (2013.01)

(58) Field of Classification Search
CPC ... H04L 1/1614; H04L 5/0053; H04L 5/0094; H04L 5/0007; H04L 5/0078; H04L 5/0082; H04W 72/042; H04W 72/0446
USPC .......... 370/328–329, 335–345, 348
See application file for complete search history.

(56) References Cited

U.S. PATENT DOCUMENTS

| | | | |
|---|---|---|---|
| 11,096,180 B2* | 8/2021 | Baldemair | H04W 76/27 |
| 2019/0149275 A1* | 5/2019 | He | H04L 1/0061 370/329 |
| 2019/0159226 A1* | 5/2019 | Ly | H04W 24/02 |
| 2020/0015176 A1* | 1/2020 | Li | H04W 72/0406 |
| 2020/0120624 A1* | 4/2020 | Lin | H04W 72/042 |
| 2020/0229092 A1* | 7/2020 | Wu | H04W 76/11 |
| 2020/0259896 A1* | 8/2020 | Sachs | G06K 19/06037 |

* cited by examiner

*Primary Examiner* — Thai D Hoang
(74) *Attorney, Agent, or Firm* — Skaar Ulbrich Macari, P.A.

(57) ABSTRACT

Methods and apparatuses for providing control resource set configuration in a wireless communication system are disclosed herein. In one method, a network node transmits a signal indicating at least a first duration and a bit map, wherein the first duration is time duration of a control resource set (CORESET) and the bit map indicates first symbol(s) of monitoring occasion(s) of the CORESET within a slot, and wherein a set of bit position indicates value one in the bit map. The network node is not allowed to transmit the signal such that an interval between two bit positions in the set in the bit map is smaller than a second duration.

20 Claims, 7 Drawing Sheets

Table 7.3.2.1-1: Supported PDCCH aggregation levels.

| Aggregation level | Number of CCEs |
|---|---|
| 1 | 1 |
| 2 | 2 |
| 4 | 4 |
| 8 | 8 |
| 16 | 16 |

FIG. 5 (PRIOR ART)

| CCE Aggregation Level | Number of Candidates |
|---|---|
| 4 | 4 |
| 8 | 2 |
| 16 | X |

FIG. 6 (PRIOR ART)

METHOD AND APPARATUS FOR PROVIDING CONTROL RESOURCE SET CONFIGURATION IN A WIRELESS COMMUNICATION SYSTEM

CROSS-REFERENCE TO RELATED APPLICATIONS

The present application is a continuation of U.S. patent application Ser. No. 16/241,368, filed Jan. 7, 2019, which claims priority to and the benefit of U.S. Provisional Patent Application Ser. No. 62/619,041, filed Jan. 18, 2018, with the entire disclosure of each referenced application incorporated fully herein by reference.

FIELD

This disclosure generally relates to wireless communication networks, and more particularly, to a method and apparatus for providing control resource set configuration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for providing control resource set configuration in a wireless communication system are disclosed herein. In one method, a network node transmits a signal indicating at least a first duration and a bit map, wherein the first duration is time duration of a control resource set (CORESET) and the bit map indicates first symbol(s) of monitoring occasion(s) of the CORESET within a slot, and wherein a set of bit position indicates value one in the bit map. The network node is not allowed to transmit the signal such that an interval between two bit positions in the set in the bit map is smaller than a second duration.

BRIEF DESCRIPTION OF THE DRAWINGS

FIG. 5 is a reproduction of Table 7.3.2.1-1 taken from 3GPP 3GPP R1-1721341.

FIG. 6 is a reproduction of Table 10.1-1 from 3GPP R1-1721343.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: Final Chairman's Note of 3GPP TSG RAN WG1 Meeting #89; Final Report of 3GPP TSG RAN WG1 #AH_NR2 v1.0.0; Final Chairman's Note of 3GPP TSG RAN WG1 Meeting #AH_NR3; Final Chairman's Note of 3GPP TSG RAN WG1 Meeting #90bis; Final Chairman's Note of 3GPP TSG RAN WG1 Meeting #91; R1-1721341, "NR; Physical channels and modulation (Release 15)"; R1-1721343, "NR; Physical layer procedures for control (Release 15)"; and TS 38.331, "NR; Radio Resource Control (RRC); Protocol specification (Release 15)". The standards and documents listed above are hereby expressly incorporated by reference in their entirety.

Figure 1:
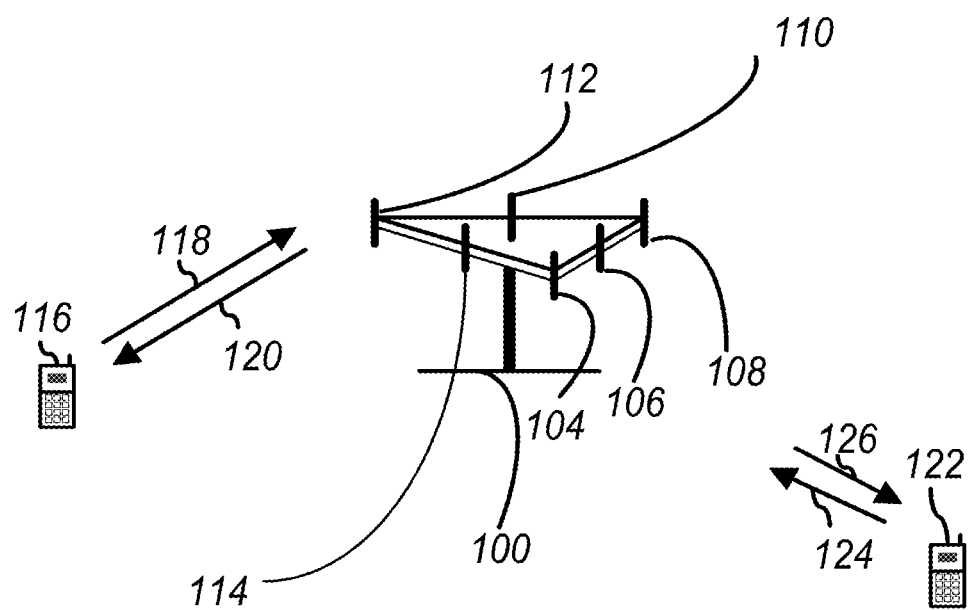
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
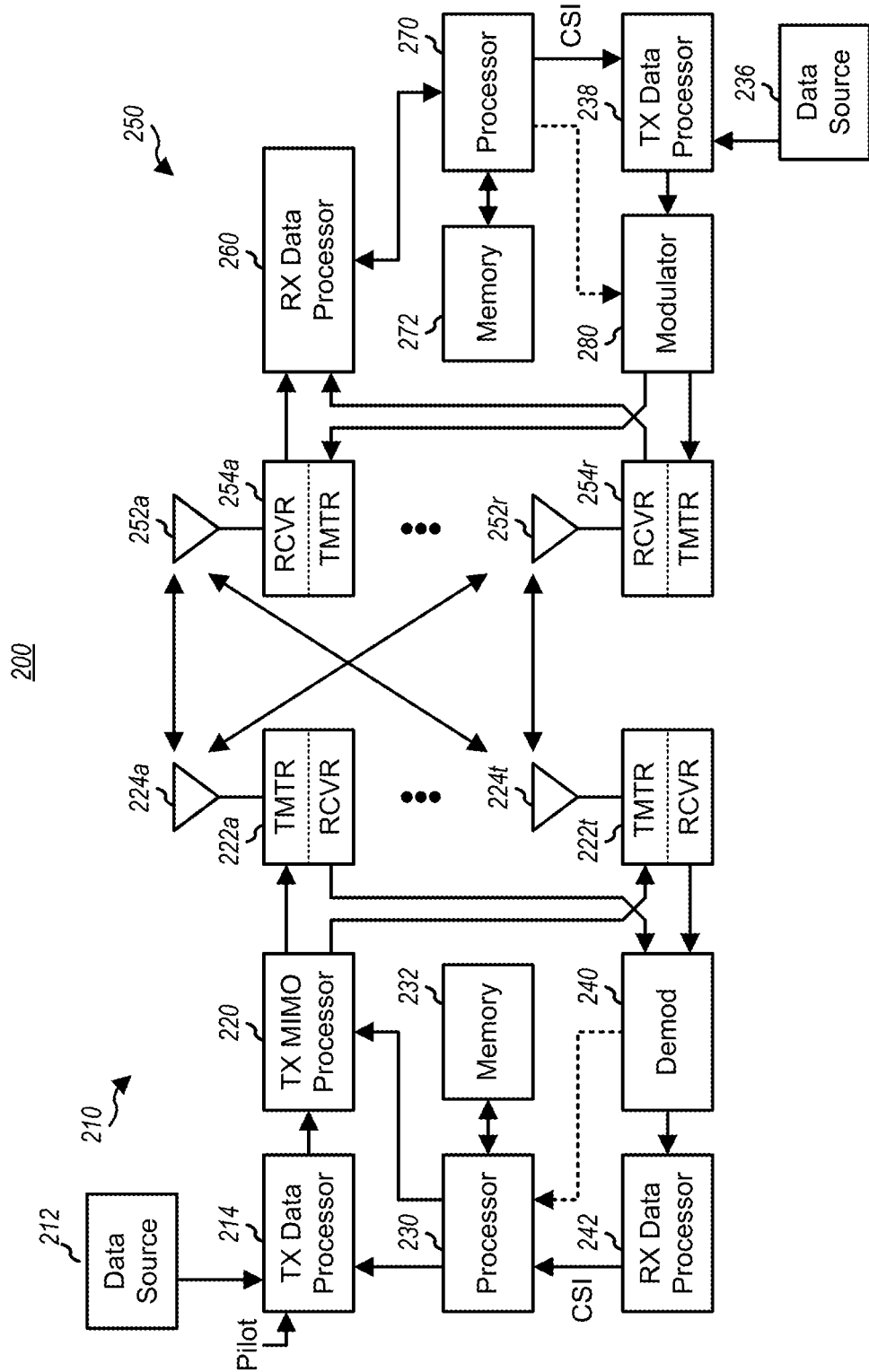
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
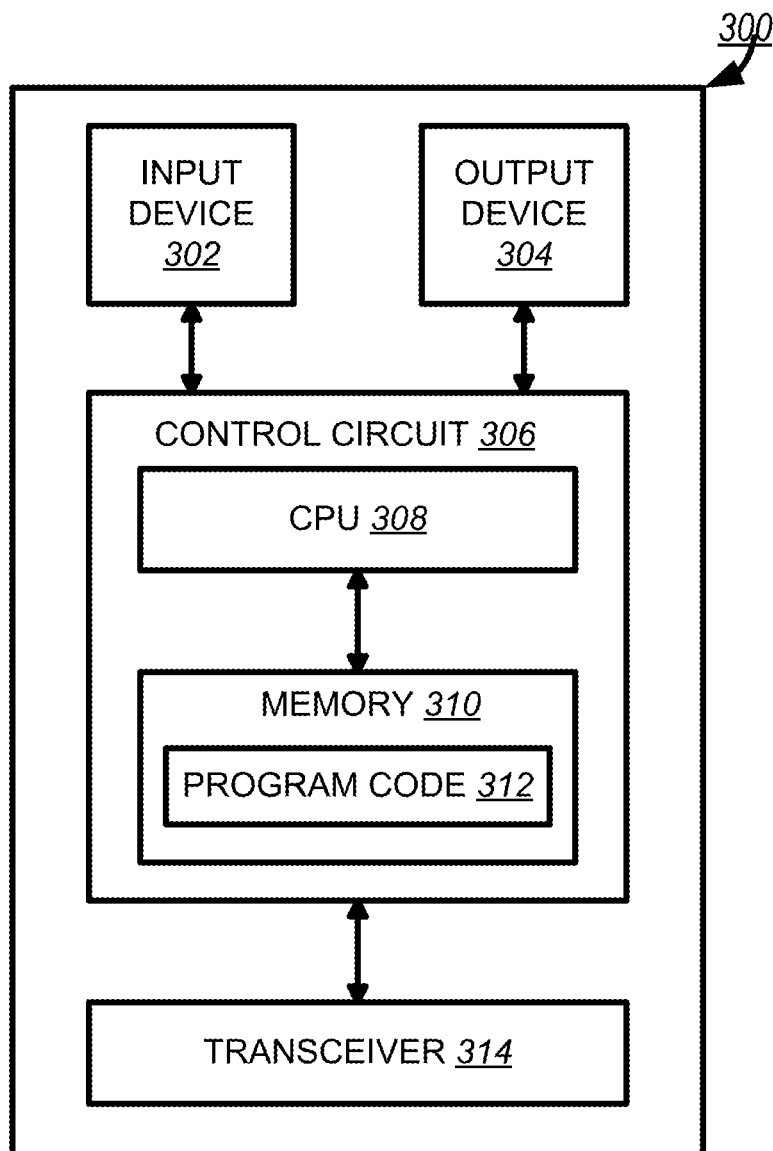
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
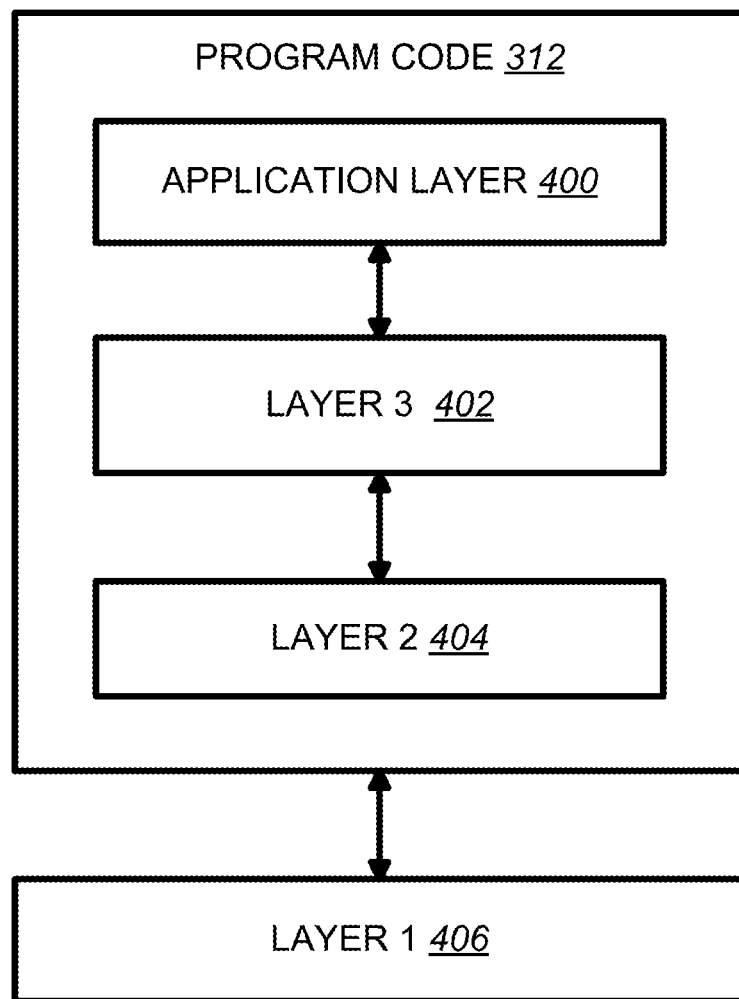
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In the Final Chairman's Note of 3GPP TSG RAN WG1 Meeting #90bis, the following agreements and working assumptions were reached:

Agreements:
  One set of the following parameters determines a set of search spaces
    A set of aggregation levels
    The number of PDCCH candidates for each aggregation level
    PDCCH monitoring occasion for the set of search spaces
Agreements:
  At least for cases other than initial access, to identify a set of search spaces, following parameters are configured by UE-specific RRC signaling:
    The number of PDCCH candidates for each aggregation level of {1, 2, 4, 8, [16]}
      One value from {0, 1, 2, 3, 4, 5, 6, 8}
    PDCCH monitoring occasion for the set of search spaces
      One value of from {1-slot, 2-slot, [5-slot], [10-slot], [20-slot]} (at least 5 values)
      One or more value(s) from $1^{st}$ symbol, $2^{nd}$ symbol, ..., $14^{th}$ symbol within a monitored slot
    Each set of search spaces associates with a CORESET configuration by RRC signaling
Update After Email Approval:
Agreements:
  For PDCCH monitoring occasion of 1-slot, 2-slot, [5-slot], [10-slot], and [20-slot],
    Slot-level offset value for PDCCH monitoring occasion is also supported.
    For N-slot monitoring occasion, the offset is one from [0, N−1].
    Note: symbol-level bit map of monitoring occasion within a slot agreed at RAN1 #90bis is still available.

In 3GPP R1-1721341, some configurations of the PDCCH structure are quoted below:

7.3.2 Physical Downlink Control Channel (PDCCH)
7.3.2.1 Control-Channel Element (CCE)

A physical downlink control channel consists of one or more control-channel elements (CCEs) as indicated in Table 7.3.2.1-1.

FIG. 5 (a reproduction of Table 7.3.2.1-1 taken from 3GPP R1-1721341).

7.3.2.2 Control-Resource Set (CORESET)

A control-resource set consists of $N_{RB}^{CORESET}$ resource blocks in the frequency domain, given by the higher-layer parameter CORESET-freq-dom, and $N_{symb}^{CORESET} \in \{1, 2, 3\}$ symbols in the time domain, given by the higher-layer parameter CORESET-time-dur, where $N_{symb}^{CORESET}=3$ is supported only if higher-layer parameter DL-DMRS-typeA-pos equals 3.

A control-channel element consists of 6 resource-element groups (REGs) where a resource-element group equals one resource block during one OFDM symbol. Resource-element groups within a control-resource set are numbered in increasing order in a time-first manner, starting with 0 for the first OFDM symbol and the lowest-numbered resource block in the control resource set.

A UE can be configured with multiple control-resource sets. Each control-resource set is associated with one CCE-to-REG mapping only.

The CCE-to-REG mapping for a control-resource set can be interleaved or non-interleaved, configured by the higher-layer parameter CORESET-CCE-REG-mapping-type, and is described by REG bundles:

REG bundle i is defined as REGs $\{iL, iL+1, \ldots, iL+L-1\}$ where L is the REG bundle size, $i=0,1, \ldots, N_{REG}^{CORESET}/L-1$, and $N_{REG}^{CORESET}=N_{RB}^{CORESET}N_{symb}^{CORESET}$ is the number of REGs in the CORESET CCE j consists of REG bundles $\{f(6j/L), f(6j/L+1), \ldots, f(6j/L+6/L-1)\}$ where $f(\cdot)$ is an interleaver For non-interleaved CCE-to-REG mapping, L=6 and $f(j)=j$ For interleaved CCE-to-REG mapping, $L \in \{2,6\}$ for $N_{symb}^{CORESET}=1$ and $L \in \{N_{symb}^{CORESET}, 6\}$ for $N_{symb}^{CORESET} \in \{2,3\}$ where L is configured by the higher-layer parameter CORESET-REG-bundle-size. The interleaver is defined by $$f(j)=(rC+c+n_{shift}) \mod (N_{REG}^{CORESET}/L)$$

$$j=cR+r$$

$$r=0,1,\ldots,R-1$$

$$c=0,1,\ldots,C-1$$

$$C=[N_{REG}^{CORESET}/(LR)]$$

where $R \in \{2, 3, 6\}$ is given by the higher-layer parameter CORESET-interleaver-size and where $n_{shift}$ is a function of $N_{ID}^{cell}$ for a PDCCH transmitted in a CORESET configured by the PBCH or RMSI
  $n_{shift} \in \{0, 1, \ldots, 274\}$ is a function of the higher-layer parameter CORESET-shift-index.

The UE may assume
  the same precoding in the frequency domain being used within a REG bundle if the higher-layer parameter CORESET-precoder-granularity equals CORESET-REG-bundle-size
  the same precoding in the frequency domain being used across the all resource-element groups within the set of contiguous resource blocks in the CORESET if the higher-layer parameter CORESET-precoder-granularity equals the size of the CORESET in the frequency domain For a CORESET configured by PBCH, L=6.

7.3.2.3 Scrambling

The UE shall assume the block of bits $b(0), \ldots, b(M_{bit}-1)$, where $M_{bit}$ is the number of bits transmitted on the physical channel, is scrambled prior to modulation, resulting in a block of scrambled bits $\tilde{b}(0), \ldots, \tilde{b}(M_{bit}-1)$ according to $$\tilde{b}(i)=(b(i)+c(i)) \mod 2$$

where the scrambling sequence c(i) is given by clause 5.2.1.

7.3.2.4 PDCCH Modulation

The UE shall assume the block of bits $\tilde{b}(0), \ldots, \tilde{b}(M_{bit}-1)$ to be QPSK modulated as described in clause 5.1.3, resulting in a block of complex-valued modulation symbols $d(0), \ldots, d(M_{symb}-1)$.

7.3.2.5 Mapping to Physical Resources

The UE shall assume the block of complex-valued symbols $d(0), \ldots, d(M_{symb}-1)$ to be scaled by a factor $\beta_{PDCCH}$ and mapped to resource elements $(k,l)_{p,\mu}$ in increasing order of first k, then l, in the resource-element groups used for the monitored PDCCH.

7.4.1.3 Demodulation Reference Signals For PDCCH
7.4.1.3.1 Sequence Generation The UE shall assume the reference-signal sequence r(m) is defined by $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is defined in clause 5.2.1.

7.4.1.3.2 Mapping to Physical Resources

The UE shall assume the sequence r(m) is mapped to physical resource elements according to $$a_{k,l}^{(p,\mu)} = \beta_{DMRS} \cdot r(3n+k')$$

$$k = N_{sc}^{RB} \lfloor n/N_{symb}^{CORESET} \rfloor + 4k'+1$$

$$k'=0,1,2$$

$$l = n \bmod N_{symb}^{CORESET}$$

$$n=0,1,\ldots$$

where the following conditions are fulfilled
  they are within the resource element groups constituting the PDCCH the UE attempts to decode if the higher-layer parameter CORESET-precoder-granularity equals CORESET-REG-bundle-size,
  all resource-element groups within the set of contiguous resource blocks in the CORESET where the UE attempts to decode the PDCCH if the higher-layer parameter CORESET-precoder-granularity equals the size of the CORESET in the frequency domain.
  The reference point for k is
  subcarrier 0 of the lowest-numbered common resource block in the CORESET if the CORESET is configured by the PBCH or RMSI,
  subcarrier 0 in common resource block 0 otherwise
  The reference point for l is the first OFDM symbol fo the CORESET.

A UE not attempting to detect a PDCCH in a CORESET shall not make any assumptions on the presence or absence of DM-RS in the CORESET.

In absence of CSI-RS or TRS configuration, and unless otherwise configured, the UE may assume PDCCH DM-RS and SS/PBCH block to be quasi co-located with respect to Doppler shift, Doppler spread, average delay, delay spread, and spatial Rx.

A CORESET can be configured with an association between the DMRS antenna port of receiving the CORESET and one or more than one reference signal(s). In 3GPP R1-1721343, the following quotation specifies the UE procedure for receiving control information.

10 UE Procedure For Receiving Control Information

If the UE is configured with a SCG, the UE shall apply the procedures described in this clause for both MCG and SCG
  When the procedures are applied for MCG, the terms 'secondary cell', 'secondary cells', 'serving cell', 'serving cells' in this clause refer to secondary cell, secondary cells, serving cell, serving cells belonging to the MCG respectively.
  When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

A UE shall monitor a set of PDCCH candidates in one or more control resource sets on the active DL BWP on each activated serving cell according to corresponding search spaces where monitoring implies decoding each PDCCH candidate according to the monitored DCI formats.

A UE can be configured by higher layer parameter SSB-periodicity-serving-cell a periodicity of half frames for transmission of SS/PBCH blocks in a serving cell. If the UE has received SSB-transmitted-SIB1 and has not received SSB-transmitted and if REs for a PDCCH reception overlap with REs corresponding to SS/PBCH block indexes indicated by SSB-transmitted-SIB1, the UE receives the PDCCH by excluding REs corresponding to SS/PBCH block indexes indicated by SSB-transmitted-SIB1. If a UE has received SSB-transmitted and if REs for a PDCCH reception overlap with REs corresponding to SS/PBCH block indexes indicated by SSB-transmitted, the UE receives the PDCCH by excluding REs corresponding to SS/PBCH block indexes indicated by SSB-transmitted.

If a carrier aggregation capability for a UE, as included in UE-NR-Capability, is larger than X, the UE includes in UE-NR-Capability an indication for a maximum number of PDCCH candidates the UE can monitor per slot when the UE is configured for carrier aggregation operation over more than X cells. When the UE is configured for carrier aggregation operation over more than X cells, the UE is not expected to be configured with a number of PDCCH candidates to monitor per slot that is larger than the maximum number.

10.1 UE Procedure For Determining Physical Downlink Control Channel Assignment A set of PDCCH candidates for a UE to monitor is defined in terms of PDCCH search spaces. A search space can be a common search space or a UE-specific search space. A UE shall monitor PDCCH candidates in non-DRX slots in one or more of the following search spaces
  a Type0-PDCCH common search space for a DCI format with CRC scrambled by a SI-RNTI on a primary cell;
  a Type0A-PDCCH common search space for a DCI format with CRC scrambled by a SI-RNTI on a primary cell;
  a Type1-PDCCH common search space for a DCI format with CRC scrambled by a RA-RNTI, or a TC-RNTI, or a C-RNTI on a primary cell;
  a Type2-PDCCH common search space for a DCI format with CRC scrambled by a P-RNTI on a primary cell;
  a Type3-PDCCH common search space for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s); and
  a UE-specific search space for a DCI format with CRC scrambled by C-RNTI or CS-RNTI(s).

A UE is provided a configuration for a control resource set for Type0-PDCCH common search space by higher layer parameter RMSI-PDCCH-Config and a subcarrier spacing by higher layer parameter RMSI-scs for PDCCH reception. The UE determines the control resource set and the monitoring occasions for Type0-PDCCH common search space as described in Subclause 14. The Type0-PDCCH common search space is defined by the CCE aggregation levels and the number of candidates per CCE aggregation level given in Table 10.1-1.

The UE may assume that the DM-RS antenna port associated with PDCCH reception in the Type0-PDCCH common search space and the Type2-PDCCH common search space, and for corresponding PDSCH receptions, and the DM-RS antenna port associated with SS/PBCH reception are quasi co-located with respect to delay spread, Doppler spread, Doppler shift, average delay, and spatial Rx parameters. The value for the DM-RS scrambling sequence initialization is the cell ID.

For Type0A-PDCCH common search space or for Type-2 PDCCH common search space, the control resource set is same as the control resource set for Type0-PDCCH common search space. A UE is provided a configuration for Type0A-PDCCH common search space by higher layer parameter osi-SearchSpace. A UE is provided a configuration for Type2-PDCCH common search space by higher layer parameter paging-SearchSpace.

A subcarrier spacing and a CP length for PDCCH reception with Type0A-PDCCH common search space, or Type1-PDCCH common search space, or Type-2 PDCCH common search space are same as for PDCCH reception with Type0-PDCCH common search space.

A UE may assume that the DM-RS antenna port associated with PDCCH reception in the Type0A-PDCCH common search space and the DM-RS antenna port associated with SS/PBCH reception are quasi co-located with respect to delay spread, Doppler spread, Doppler shift, average delay, and spatial Rx parameters.

A UE may assume that the DM-RS antenna port associated with PDCCH reception and associated PDSCH reception in the Type1-PDCCH common search space are quasi co-located with the DM-RS antenna port of the SS/PBCH reception associated with a corresponding PRACH transmission.

If a value for the DM-RS scrambling sequence initialization for Type0A-PDCCH common search space, or Type1-PDCCH common search space, or Type-2 PDCCH common search space is not provided by higher layer parameter PDCCH-DMRS-Scrambling-ID in SystemInformation-BlockType1, the value is the cell ID.

If a UE is configured for downlink bandwidth part (BWP) operation, as described in Subclause 12, the above configurations for the common search spaces apply for the initial active DL BWP. The UE can be additionally configured a control resource set for Type0-PDCCH common search space, Type0A-PDCCH common search space, Type1-PDCCH common search space, or Type2-PDCCH common search space for each configured DL BWP on the primary cell, other than the initial active DL BWP, as described in Subclause 12.

FIG. 6 (a reproduction of Table 10.1-1 from 3GPP R1-1721343 showing CCE aggregation levels and number of candidates per CCE aggregation level for PDCCH scheduling SystemInformationBlockType1 in Type0-PDCCH common search space)

For a serving cell, higher layer signalling provides a UE with P control resource sets. For control resource set p, 0≤p<P where a UE-specific search space, a Type2-PDCCH common search space, or a Type3-PDCCH common search space is mapped, the higher layer signalling provides:

a control resource set index by higher layer parameter CORESET-ID;
a DM-RS scrambling sequence initialization value by higher layer parameter PDCCH-DMRS-Scrambling-ID;
a number of consecutive symbols provided by higher layer parameter CORESET-time-duration;
a set of resource blocks provided by higher layer parameter CORESET-freq-dom;
a CCE-to-REG mapping provided by higher layer parameter CORESET-CCE-to-REG-mapping-type;
a REG bundle size, in case of interleaved CCE-to-REG mapping, provided by higher layer parameter CORESET-REG-bundle-size;
a cyclic shift for the REG bundle interleaver [4, 38.211] by higher layer parameter CORESET-shift-index;
an antenna port quasi co-location, from a set of antenna port quasi co-locations provided by higher layer parameter TCI-StatesPDCCH, indicating quasi co-location information of the DM-RS antenna port for PDCCH reception;
an indication for a presence or absence of a transmission configuration indication (TCI) field for DCI format 1_0 or DCI format 1_1 transmitted by a PDCCH in control resource set p, by higher layer parameter TCI-PresentInDCI.

For each control resource set in a DL BWP of a serving cell, a respective higher layer parameter CORESET-freqdom provides a bitmap. The bits of the bitmap have a one-to-one mapping with non-overlapping groups of 6 PRBs, in ascending order of the PRB index in the DL BWP bandwidth of $N_{RB}^{BWP}$ PRBs where the first PRB of the first group of 6 PRBs has index $6 \cdot \lceil N_{RB}^{BWP}/6 \rceil$.

If the UE has not received an indication for an antenna port quasi co-location from the set of antenna port quasi co-locations provided by TCI-StatesPDCCH, the UE assumes that the DM-RS antenna port associated with PDCCH reception in the UE-specific search space is quasi co-located with the DM-RS antenna port associated with PBCH reception with respect to delay spread, Doppler spread, Doppler shift, average delay, and spatial Rx parameters.

For each serving cell that a UE is configured to monitor PDCCH in a search space other than Type0-PDCCH common search space, the UE is configured the following:

a number of search space sets by higher layer parameter search-space-config;
for each search space set in a control resource set p
an indication that the search space set is a common search space set or a UE-specific search space set by higher layer parameter Common-search-space-flag;
a number of PDCCH candidates $M_p^{(L)}$ per CCE aggregation level L by higher layer parameters Aggregation-level-1, Aggregation-level-2, Aggregation-level-4, Aggregation-level-8, and Aggregation-level-16, for CCE aggregation level 1, CCE aggregation level 2, CCE aggregation level 4, CCE aggregation level 8, and CCE aggregation level 16, respectively;
a PDCCH monitoring periodicity of $k_p$ slots by higher layer parameter Monitoring-periodicity-PDCCH-slot;
a PDCCH monitoring offset of $o_p$ slots, where $0 \leq o_p < k_p$, by higher layer parameter Monitoring-offset-PDCCH-slot;
a PDCCH monitoring pattern within a slot, indicating first symbol(s) of the control resource set within a slot for PDCCH monitoring, by higher layer parameter Monitoring-symbols-PDCCH-within-slot.

A UE determines a PDCCH monitoring occasion from the PDCCH monitoring periodicity, the PDCCH monitoring offset, and the PDCCH monitoring pattern within a slot.

A PDCCH UE-specific search space $S_{k_p}^{(L)}$ at CCE aggregation level $L \in \{1, 2, 4, 8, 16\}$ is defined by a set of PDCCH candidates for CCE aggregation level L.

If a UE is configured with higher layer parameter Cross-CarrierSchedulingConfig for a serving cell the carrier indicator field value corresponds to the value indicated by CrossCarrierSchedulingConfig.

For a serving cell on which a UE monitors PDCCH candidates in a UE-specific search space, if the UE is not configured with a carrier indicator field, the UE shall monitor the PDCCH candidates without carrier indicator field. For a serving cell on which a UE monitors PDCCH candidates in a UE-specific search space, if a UE is configured with a carrier indicator field, the UE shall monitor the PDCCH candidates with carrier indicator field.

A UE is not expected to monitor PDCCH candidates on a secondary cell if the UE is configured to monitor PDCCH candidates with carrier indicator field corresponding to that secondary cell in another serving cell. For the serving cell on which the UE monitors PDCCH candidates, the UE shall monitor PDCCH candidates at least for the same serving cell.

For a control resource set p, the CCEs corresponding to PDCCH candidate $m_{n_{CI}}$ of the search space for a serving cell corresponding to carrier indicator field value $n_{CI}$ are given by $$L \cdot \left\{ \left( Y_{p,k_p} + \left\lfloor \frac{m_{n_{CI}} \cdot N_{CCE,p}}{L \cdot M_{p,max}^{(L)}} \right\rfloor + n_{CI} \right) \bmod \lfloor N_{CCE,p}/L \rfloor \right\} + i$$

where
for any common search space, $Y_{p,k_p}=0$;
for a UE-specific search space, $Y_{p,k_p}=(A_p \cdot Y_{p,k_p-1})$ mod D, $Y_{p,-1}=n_{RNTI} \neq 0$, $A_0=39827$, $A_1=39829$, and $D=65537$;
$i=0, \ldots, L-1$;

$n_{CI}$ is the carrier indicator field value if the UE is configured with a carrier indicator field for the serving cell on which PDCCH is monitored; otherwise, including for any common search space, $n_{CI}=0$;

$N_{CCE,p}$ is the number of CCEs, numbered from 0 to $N_{CCE,p}-1$, in control resource set p;

$m_{n_{CI}}=0, \ldots, M_{p,n_{CI}}^{(L)}-1$, where $M_{p,n_{CI}}^{(L)}$ is the number of PDCCH candidates the UE is configured to monitor for aggregation level L for a serving cell corresponding to $n_{CI}$;

for any common search space, $M_{p,max}^{(L)}=M_{p,0}^{(L)}$;

for a UE-specific search space, $M_{p,max}^{(L)}$ is the maximum of $M_{p,n_{CI}}^{(L)}$ for all corresponding DCI formats over all configured $n_{CI}$ values for a CCE aggregation level L in control resource set p;

the RNTI value used for $n_{RNTI}$ is defined in [5, TS 38.212] and in [6, TS 38.214].

A UE configured to monitor PDCCH candidates in a serving cell with a DCI format size with carrier indicator field and CRC scrambled by C-RNTI, where the PDCCH candidates may have one or more possible values of carrier indicator field for the DCI format size, shall assume that an PDCCH candidate with the DCI format size may be transmitted in the serving cell in any PDCCH UE specific search space corresponding to any of the possible values of carrier indicator field for the DCI format size.

In 3GPP TS 38.331, PDCCH-Config IE in the RRC standard is quoted as follows:
PDCCH-Config The PDCCH-Config IE is used to configure UE specific PDCCH parameters such as control resource sets (CORESET), search spaces and additional parameters for acquiring the PDCCH.

---

PDCCH-Config information element

```
ASN1START
TAG-PDCCH-CONFIG-START
Downlink control channel related parameters
PDCCH-Config :: = SEQUENCE {
List of Control Resource Sets (CORESETs) to be used by the UE
controlResourceSetToAddModList SEQUENCE (SIZE
(1 . . . maxNrofControlResourceSets)) OF ControlResourceSet
OPTIONAL,
controlResourceSetToReleaseList SEQUENCE (SIZE
(1 . . . maxNrofControlResourceSets)) OF ControlResourceId OPTIONAL
searchSpacesToAddModList SEQUENCE (SIZE
(1 . . . maxNrofSearchSpaces) OF SearchSpace
OPTIONAL,
searchSpacesToReleaseList SEQUENCE (SIZE
(1 . . . maxNrofSearchSpaces) OF SearchSpaceId OPTIONAL
FFS: Is this timing information applicable to the entire PDCCH
or could it be different per CORESET?
FFS: Is there a default timing (to be used at least until first
reconfiguration). Are the fields optionally present?
timing SEQUENCE {
dl-assignment-to-DL-data TYPE_FFS!,
ul-assignment-to-UL-data TYPE_FFS!,
dl-data-to-UL-ACK TYPE_FFS!
}
OPTIONAL,
}
A time/frequency control resource set (CORESET) in which to
search for downlink control information (see 38.213, section
x.x.x.x) FFS_Ref
ControlResourceSet :: = SEQUENCE {
controlResourceSetId ControlResourceSetId,
Frequency domain resources for the CORESET. The network ensures
that the CORESET is within the BWP configured for a UE. (see 38.213,
REF)
frequencyDomainResources TYPE_FFS!,
Starting OFDM symbol for the CORESET (see 38.213, REF)
startSymbol INTEGER (0 . . . maxCoReSetStartSymbol),
Contiguouse time duration of the CORESET in number of symbols
see 38.213, section x.x.x.x) FFS_Ref
duration INTEGER (1 . . . maxCoReSetDuration),
Resource Element Groups (REGs) can be bundled to create REG
bundles. This parameter defines the size of such bundles.
(see 38.211, section 7.3.2.2)
reg-BundleSize ENUMERATED {n2, n3, n6},
Mapping of Control Channel Elements (CCE) to Resource Element
Groups (REG). (see 38.211, 38.213, FFS_REF)
cce-reg-MappingType ENUMERATED {interleaved,
nonInterleaved},
Precoder granularity in frequency domain (see 38.213, section
FFS_REF)
precoderGranularity TYPE_FFS!,
Corresponds to L1 parameter 'CORESET-interleaver-rows' (see
38.211, 38.213, section FFS_Section)
interleaverRows ENUMERATED {n2, n3,
n6}
OPTIONAL,
Corresponds to L1 parameter 'CORESET-shift-index' (see 38.211,
38.213, section FFS_Section)
shiftIndex FFS_Value
OPTIONAL,
Reference to a configured TCI State providing QCL
configuration/indication for PDCCH.
Corresponds to L1 parameter 'TCI-StateRefId' (see 38.211,
38.213, section FFS_Section)
tci-
StateRefId FFS_Value
OPTIONAL,
PDCCH DMRS scrambling initalization. Corresponds to L1 parameter
'PDCCH-DMRS-Scrambling-ID' (see 38.214, section 5.1)
When the field is absent the UE applies the value TBD/FFS
pdcch-DMRS-
ScramblingID FFS_Value
OPTIONAL
}
ID of a Control Resource Set.
ControlResourceSetId :: = INTEGER
(0 . . . maxNrofControlResourceSets - 1)
A search space defines how/where to search for PDCCH candidates.
A search space is associated with one Control Resource Set
```

-continued

| PDCCH-Config information element |
|---|
| SearchSpace ::= SEQUENCE {<br>searchSpaceId SearchSpaceId,<br>The CORESET applicable for this SearchSpace.<br>FFS: Value 0 identifies the common CORESET configured in MIB?<br>FFS: Values 1 . . . maxNrofControlResourceSets − 1 identify CORESETs<br>configured by dedicated signalling?<br>controlResourceSetId ControlResourceSetId,<br>Slots for PDCCH Monitoring configured as periodicity and offset.<br>Corresponds to L1 parameters 'Montoring-periodicity-PDCCH-slot' and<br>'Montoring-offset-PDCCH-slot' (see 38.213, section 10)<br>sl15, sl10, sl20 FFS<br>monitoringSlotPeriodicityAndOffset CHOICE {<br>sl1 NULL,<br>sl2 INTEGER (0 . . . 1),<br>sl5 INTEGER (0 . . . 4),<br>sl10 INTEGER (0 . . . 9),<br>sl20 INTEGER (0 . . . 19)<br>}<br>OPTIONAL,<br>Symbols for PDCCH monitoring in the slots configured for PDCCH<br>monitoring (see monitoringSlotPeriodicityAndOffset).<br>The most significant (left) bit represents the first OFDM in a<br>slot. The least significant (right) bit represents the last symbol.<br>Corresponds to L1 parameter 'Montoring-symbols-PDCCH-within-<br>slot' (see 38.213, section 10)<br>monitoringSymbolsWithinSlot BIT STRING (SIZE<br>(14))<br>OPTIONAL,<br>Number of candidates per aggregation level. Corresponds to L1<br>parameter 'Aggregation-level-1' to 'Aggregation-level-8'<br>(see 38.213, section 10)<br>nrofCandidates SEQUENCE {<br>aggregationLevel1 ENUMERATED {n0, n1, n2, n3, n4,<br>n5, n6, n8},<br>aggregationLevel2 ENUMERATED {n0, n1, n2, n3, n4,<br>n5, n6, n8},<br>aggregationLevel4 ENUMERATED {n0, n1, n2, n3, n4,<br>n5, n6, n8},<br>aggregationLevel8 ENUMERATED {n0, n1, n2, n3, n4,<br>n5, n6, n8}<br>} |

The following terminology and assumption may be used hereafter in the detailed description:
  BS: a network central unit or a network node in NR which is used to control one or multiple TRPs which are associated with one or multiple cells. Communication between BS and TRP(s) is via fronthaul. BS may be referred to as central unit (CU), eNB, gNB, or NodeB.
  TRP: a transmission and reception point provides network coverage and directly communicates with UEs. TRP may be referred to as distributed unit (DU) or network node.
  Cell: a cell is composed of one or multiple associated TRPs, i.e. coverage of the cell is composed of coverage of all associated TRP(s). One cell is controlled by one BS. Cell may be referred to as TRP group (TRPG).
  NR-PDCCH: A channel carries downlink control signal which is used to control communication between a UE and a network side. A network transmits NR-PDCCH on configured control resource set (CORESET) to the UE.
  Slot: a scheduling unit in NR. Slot duration is 14 OFDM symbols.
  Mini-slot: a scheduling unit with duration less than 14 OFDM symbols.

In the current NR standard as disclosed in 3GPP R1-1721343 and TS 38.331, a CORESET can be configured by indicating time duration and a bit map. The bit map may indicate at least a starting OFDM symbol for monitoring the CORESET in a slot. Each bit in the bit map corresponds to an OFDM symbol in a slot. If a bit position in the bit map has a value of one, it represents a starting OFDM symbol for monitoring the CORESET. The CORESET may be monitored from at least a starting OFDM symbol(s) indicated by the bit map and occupying following OFDM symbol(s) until the configured time duration is reached. For example, if the time duration of a CORESET is configured as 2 and the bit map indicates 10000000000000, the UE may monitor the CORESET (receive at least a PDCCH) on OFDM symbol #0 and #1 in a slot.

However, if a bit map indicates a starting OFDM symbol belonging to the following OFDM symbol(s) of previous starting OFDM symbol indicated by the bit map (e.g., time duration of a CORESET is 2 and the bit map is 11000000000000), a UE may be confused about the configuration. If this situation does not specify nor is captured in the standard, how a UE treat this situation needs further consideration. In addition, if the bit map indicates a starting OFDM symbol on the last few OFDM symbols of a slot, this may create a problem where the CORESET may be configured across a slot boundary. For example, if time duration of a CORESET is 2 and the bit map is 00000000000001, how a UE handle this configuration also needs further consideration. Potential solutions are described below.

According to one solution, a restriction on the configuration of a CORESET is established. The UE does not expect to receive a CORESET configuration with an overlap OFDM symbols indicated by a bit map indication and the CORESET duration and/or with a CORESET monitoring pattern across a slot boundary.

According to another solution, the UE is configured to or could deal with one of the above-possible scenarios. For example, a UE is configured with a CORESET. Alternatively, the UE receives a signal indicating configuration of a CORESET. The configuration of the CORESET includes at least time duration of the CORESET and a bit map. The bit map comprises 14 bits. A set of the bit position(s) in the bit map have value one. The set of bit position(s) indicates the starting OFDM symbol(s) in a slot for monitoring the CORESET. The interval (or distance) between each bit position (indicating value one) in the set (or bitmap) is larger than or equal to a number. The interval (or distance) between two bit positions indicating the value one in the bit map is larger than or equal to a number. The interval (or distance) between two neighboring bit positions indicating value one in the set is larger than or equal to a number. Two neighboring bit positions indicating the value one could be the two closest bit positions indicating value 1. An interval or distance between two bit positions could be a number of bits between the two bit positions. The two bit positions could be neglected when calculating the interval or distance. For example, an interval or distance between two bit positions indicating value 1 for a bitmap "10001000000000" is 3. Alternatively, an interval or distance between two bit positions could be difference of the two bit positions.

In one embodiment, the number is the time duration of the CORESET. Alternatively, the number is the time duration of the CORESET minus one. In another alternative, the number is the maximum time duration of the CORESET minus one. For example, if time duration of a CORESET is configured as 2, a bit map of a CORESET has a restriction that interval between two bit positions indicating value one is larger than or equal to 2 minus 1 (e.g., the bit map is 10100000000000). The UE does not expect to receive a configuration of a bit map such that the interval (or distance) between the two bit positions indicating value one in the bit map is smaller than the number (e.g., the bit map is 11000000000000). The UE could ignore a configuration of the bit map such that the interval (or distance) between two bit positions indicating value one in the bit map is smaller than the number (e.g., the bit map is 11000000000000 when the number is 1). The UE could ignore part of the bit map such that the interval (or distance) between the bit positions indicating value one in the part of the bit map is smaller than the number (e.g., if the bit map is 11000000100000, the UE ignores the first two 1 and applies the last 1 when the number is 1). The UE does not apply a configuration of the bit map such that the interval (or distance) between two bit positions indicating value one in the bit map is smaller than the number (e.g., the bit map is 11000000000000 when the number is 1).

In one embodiment, a base station does not configure the UE with a bit map such that the interval (or distance) between two bit positions indicating value one in the bit map is smaller than the number (e.g., the bit map is 11000000000000 when the number is 1). The most significant bit in the bit map represents the first OFDM symbol in a slot. The least significant bit in the bit map represents the last OFDM symbol in a slot. The signal could be PDCCH-Config. The bitmap could be monitoringSymbolsWithinSlot. The time duration could be CORESET-time-duration. The UE may monitor the CORESET on the OFDM symbol(s) in a slot based on the signal. The UE may monitor the CORE-SET on OFDM symbol(s) starting from each bit position in the set in a slot.

Alternatively, the bit map can indicate at least a monitoring occasion for the CORESET by indicating a starting OFDM symbol with the following contiguous OFDM symbol(s) until the time duration of the CORESET is reached. The UE may interpret the bit map based on the time duration of the CORESET. For example, when a UE is configured with a time duration 2 and a bit map "11011000000000", the UE monitors the CORESET the following symbols in a slot: $\{1^{st}$ symbol, $2^{nd}$ symbol$\}$ and $\{4^{th}$ symbol, $5^{th}$ symbol$\}$.

Within a slot, different monitoring occasions for the CORESET indicated by the bit map can be separated by at least one bit position indicating the value 0. If the bit map indicates a number of contiguous bit position(s) with the value 1, which the number is smaller than the time duration of the CORESET, the UE may interpret the number of contiguous bit position(s) with the value 1 indicating a monitoring occasion for the CORESET with time duration as the number. For example, when a UE is configured with time duration 3 and a bit map "11000101011100", the UE monitors CORESET for the following symbols in a slot: $\{1^{st}$ symbol, $2^{nd}$ symbol$\}$, $\{6^{th}$ symbol$\}$, $\{8^{th}$ symbol$\}$, and $\{10^{th}$ symbol, $11^{th}$ symbol, $12^{th}$ symbol$\}$. In this example, the UE may interpret the number of contiguous bit position(s) indicating value 1 in the bit map which is smaller than the time duration 3 as a CORESET monitoring occasion with the time duration same as the contiguous number of the value 1.

If a bit map indicates a number of contiguous bit position(s) with the value 1, wherein the number is larger than the time duration of the CORESET, the UE may interpret the number of contiguous bit position(s) with the value 1 as contiguous monitoring occasions for the CORE-SET with the time duration or smaller than the time duration. More specifically, if the number of contiguous bit position(s) indicating the value 1 is multiple of the time duration of the CORESET, the UE may interpret the number of contiguous bit position(s) with the value 1 as contiguous monitoring occasion(s) for the CORESET with the time duration. If the number of contiguous bit position(s) indicating the value 1 is not a multiple of the time duration of the CORESET, the UE may interpret the number of contiguous bit position(s) with the value 1 as that earlier contiguous bit(s) indicates contiguous monitoring occasion(s) for the CORESET with the time duration and the last orphan bit(s) indicates a monitoring occasion for CORESET with time duration smaller than the time duration of the CORESET which depends on number of last orphan bit(s). Alternatively, the last orphan bit(s) in the number of contiguous bit(s) with the value 1 can be ignored by the UE. For example, when a UE is configured with a time duration 2 and a bit map "11110000000000", the UE monitors the CORESET for the following symbols in a slot: $\{1^{st}$ symbol, $2^{nd}$ symbol$\}$, $\{3^{rd}$ symbol, $4^{th}$ symbol$\}$. In another example, when a UE is configured with time duration 2 and a bit map "1110000000000", the UE monitors the CORESET for the following symbols in a slot: $\{1^{st}$ symbol, $2^{nd}$ symbol$\}$, $\{3^{rd}$ symbol$\}$. In a similar example, when a UE is configured with a time duration 2 and a bit map "1110000000000", the UE monitors the CORESET for the following symbols in a slot: $\{1^{st}$ symbol, $2^{nd}$ symbol$\}$. In this example, the UE ignores $\{3^{rd}$ symbol$\}$ indicated by the bit map.

Alternatively, if bit map indicates a number of contiguous bit position(s) with value 1, which the number is larger than the time duration of the CORESET, the UE may interpret the number of contiguous bit position(s) with the value 1 as at least a monitoring occasion for the CORESET in which the time duration of the CORESET is the number of the contiguous bit position(s) with value 1. For example, when a UE is configured with the time duration 2 and a bit map "11100110000000", the UE monitors the CORESET for the following symbols in a slot: $\{1^{st}$ symbol, $2^{nd}$ symbol, $3^{rd}$ symbol$\}$, $\{5^{th}$ symbol, $6^{th}$ symbol$\}$.

Alternatively, if a bit map indicates a number of contiguous bit position(s) with value 1 wherein the number is larger than the time duration of the CORESET, the UE may interpret the number of contiguous bit position(s) with the value 1 as at least a monitoring occasion for the CORESET in which the time duration of the CORESET is the maximum time duration of a CORESET. For example, when a UE is configured with time duration 2 and a bit map "11110000000000", the UE monitors the CORESET for the following symbols in a slot: $\{1^{st}$ symbol, $2^{nd}$ symbol, $3^{rd}$ symbol$\}$, $\{4^{th}$ symbol$\}$ when the maximum time duration of the CORESET is 3.

Alternatively, the signal indicates at least a bit map. The UE may receive the PDCCH on the OFDM symbol(s) in a slot based on the bit map. The bit map indicates at least a bit position and/or at least on a contiguous bit position(s) as value one. The UE may monitor a CORESET on the OFDM symbol(s) in a slot based on the bit map. The UE may view the contiguous bit position(s) as a CORESET. The UE may not expect to have the bit map indicating the number of the contiguous bit position(s) with value one exceeds maximum time duration for a CORESET.

Alternatively, if the UE receives the bit map indicating the number of the contiguous bit position(s) with value one exceeds maximum time duration for a CORESET, the UE may ignore part of the indication of the bit map. Alternatively, the UE may ignore the whole indication of the bit map. For example, when a UE is configured with a bit map "11010111000000", the UE monitors the CORESET for the following symbols in a slot: $\{1^{st}$ symbol, $2^{nd}$ symbol$\}$, $\{4^{th}$ symbol$\}$, $\{6^{th}$ symbol, $7^{th}$ symbol, $8^{th}$ symbol$\}$ when the maximum time duration of the CORESET is 3. In a similar example, when a UE is configured with a bit map "11100001100000", the UE may ignore the first three 1's because it will exceed the maximum time duration if the maximum time duration of CORESET is 2. In the above example, the UE may monitor the CORESET in the following symbols in a slot: {$8^{th}$ symbol, $9^{th}$ symbol}.

The time duration of a CORESET can be determined based on the bit map and each contiguous bit position(s) with the value one in the bit map. The signal does not indicate the time duration for a CORESET. The signal indicates a different configuration for different time duration CORESET(s). The configuration may comprise at least the Control Channel Element (CCE)-Resource Element Group (REG) mapping type, aggregation level, search space configuration, and frequency resource assignment. The configuration could be PDCCH-config.

In one embodiment, a UE is configured with a CORESET. Alternatively, the UE receives a signal indicating the configuration of a CORESET. The configuration of the CORESET comprises at least time duration of the CORESET and a bit map. The bit map comprises 14 bits. The first bit position and the second bit position in the bit map indicate the value one. The interval (or distance) between the first bit position and the second bit position is smaller than a number. The interval (or distance) between two bit positions indicating the value one in the bitmap is larger than or equal to a number. The interval (or distance) between two neighboring bit positions indicating the value one in the set is smaller than a number. The two neighboring bit positions indicating the value one could be the two closest bit positions indicating the value 1. An interval or distance between two bit positions is the number of bits between the two bit positions. The two bit positions could be neglected when calculating the interval or distance. For example, an interval or distance between two bit positions indicating the value 1 for a bitmap "10001000000000" is 3. More specifically, the number is the time duration of the CORESET. Alternatively, the number is time duration of the CORESET minus one. Alternatively, the number is the maximum time duration of the CORESET minus one. Alternatively, the number is the maximum time duration of the CORESET minus one. For example, if time duration of a CORESET is configured as 2, a bit map of a CORESET may be 11000000000000. The first bit position is closer to the most significant bit in the bit map than the second bit position. The most significant bit in the bit map represents the first OFDM symbol in a slot. The least significant bit in the bit map represents the last OFDM symbol in a slot. The signal could be a PDCCH-Config. The bitmap could be monitoringSymbolsWithinSlot. The time duration could be a CORESET-time-duration.

The UE may monitor the CORESET on OFDM symbol(s) in a slot based on the bit map. The UE may monitor the CORESET on OFDM symbol(s) in a slot starting from the bit position(s) in the bit map indicating a value. The value could be one. The UE may monitor the CORESET on OFDM symbol(s) in a slot starting from the bit position(s) in the bit map indicating the value. Alternatively, the UE may monitor the CORESET on OFDM symbol(s) in a slot starting from the bit position(s) in the bit map indicating the value excluding both or one of two bit position(s) wherein the interval (or distance) between the two bit positions is smaller than the number.

Alternatively, the UE may monitor the CORESET on OFDM symbol(s) in a slot starting from bit position(s) in the bit map indicating the value excluding the first bit position and the second bit position. Alternatively, the UE may monitor the CORESET on OFDM symbol(s) in a slot starting from bit position(s) in the bit map indicating the value excluding the first bit position. Alternatively, the UE may monitor the CORESET on OFDM symbol(s) in a slot starting from bit position(s) in the bit map indicating the value excluding the second bit position. For example, when a UE is configured with time duration 2 and a bit map "11000101000000", the UE monitors the CORESET for the following symbols in a slot: {$6^{th}$ symbol, $7^{th}$ symbol} and {$8^{th}$ symbol, $9^{th}$ symbol}. In this example, the bit locations with too short interval/distance are excluded. In another example, when a UE is configured with time duration 2 and a bit map "11000101000000", the UE monitors the CORESET for the following symbols in a slot: {$1^{st}$ symbol, $2^{nd}$ symbol}, {$6^{th}$ symbol, $7^{th}$ symbol} and {$8^{th}$ symbol, $9^{th}$ symbol}. In this example, one (the latter one) of the two bit locations with too short interval/distance are excluded. A similar example could be that when a UE is configured with time duration 2 and a bit map "11000101000000", the UE monitors the CORESET for the following symbols in a slot: {$2^{nd}$ symbol, $3^{rd}$ symbol}, {$6^{th}$ symbol, $7^{th}$ symbol} and {$8^{th}$ symbol, $9^{th}$ symbol}, e.g., excluding the earlier one.

Alternatively, the OFDM symbols for different CORESET could overlap. The OFDM symbol between two CORESETs could overlap if the interval (or distance) between the starting position of the two CORESETs is shorter than the number. In one example, when a UE is configured with a time duration of 2 and a bit map "11000101000000", the UE monitors the CORESET for the following symbols in a slot: {$1^{st}$ symbol, $2^{nd}$ symbol}, {$2^{nd}$ symbol, $3^{rd}$ symbol}, {$6^{th}$ symbol, $7^{th}$ symbol} and {$8^{th}$ symbol, $9^{th}$ symbol}.

Alternatively, the CORESET time duration of CORESETs associated with a bitmap within a slot could be different. The CORESET time duration could be different from the configured value if the interval (or distance) between starting symbol of two CORESETs is shorter than the number. In one example, when a UE is configured with a time duration of 2 and a bit map "11000101000000", the UE monitors the CORESET for the following symbols in a slot: {1st symbol}, {$2^{nd}$ symbol}, {$6^{th}$ symbol, $7^{th}$ symbol} and {$8^{th}$ symbol, $9^{th}$ symbol}. It can be observed that the CORESETs corresponding to the first two bits in the bitmap have 1 symbol time duration even if the configured value is 2, e.g., due to short interval or distance. In a similar example, when a UE is configured with a time duration of 2 and a bit map "11100101000000", the UE monitors the CORESET for the following symbols in a slot: {$1^{st}$ symbol}, {$2^{nd}$ symbol}, {$3^{rd}$ symbol}, {$6^{th}$ symbol, $7^{th}$ symbol} and {$8^{th}$ symbol, $9^{th}$ symbol} or {$1^{st}$ symbol, $2^{nd}$ symbol}, {$3^{rd}$ symbol}, {$6^{th}$ symbol, $7^{th}$ symbol} and {$8^{th}$ symbol, $9^{th}$ symbol} or alternatively {$1^{st}$ symbol}, {$2^{nd}$ symbol, $3^{rd}$ symbol}, {$6^{th}$ symbol, $7^{th}$ symbol} and {$8^{th}$ symbol, $9^{th}$ symbol}. It can be observed later two alternatives allow one CORESET corresponding to the first three bits in the bit map to have a CORESET time duration with a configured value, i.e., 2 and one CORESET have time duration which is different from the configured value, e.g., 1. For bit locations corresponding to short interval or distance, time duration can be used as a maximum time duration or an upper bound of time duration. For bit locations corresponding to a short interval or distance, a value of 1 could mean a corresponding symbol containing the CORESET and the corresponding symbol is not the first symbol or starting symbol of the CORESET.

Different alternatives or different examples can be applied in different slot. For example, the UE may monitor the CORESET on OFDM symbol(s) in an even slot (i.e., a slot with even slot number) starting from the bit position(s) in the bit map indicating the value excluding the first bit position, and the UE may monitor the CORESET on OFDM symbol(s) in an odd slot starting from the bit position(s) in the bit map indicating the value excluding the second bit position or vice versa. Different alternatives or examples can be applied to a configuration or an indication. The configuration or indication can be transmitted by a base station to a UE.

In one embodiment, the UE may ignore the configuration of the CORESET. The UE may transmit a Negative Acknowledgement (NACK) as a feedback of the signal.

In one alternative, the UE may monitor the CORESET on OFDM symbol(s) in an even slot based on the bit map excluding the second bit position. Alternatively, the UE may monitor the CORESET on OFDM symbol(s) in an odd slot based on the bit map excluding the second bit position. Alternatively, the UE may monitor the CORESET on OFDM symbol(s) in an even slot based on the bit map excluding the first bit position. Alternatively, the UE may monitor the CORESET on OFDM symbol(s) in an odd slot based on the bit map excluding the first bit position.

The signal may include a pattern for indicating the bit map. The pattern indicates a slot level bit map. If the bit position of the slot level bit map corresponding to a slot indicates the value of one, the UE monitors the CORESET in the slot based on the bit map excluding the second bit position. If the bit position of the slot level bit map corresponding to a slot indicates the value of one, the UE monitors the CORESET in the slot based on the bit map excluding the first bit position. Alternatively, if bit position of the slot level bit map corresponding to a slot indicates the value of zero, the UE monitors the CORESET in the slot based on the bit map excluding the first bit position. Alternatively, if bit position of the slot level bit map corresponding to a slot indicates the value of zero, the UE monitors the CORESET in the slot based on the bit map excluding the second bit position.

The UE can be configured with two CORESETs (e.g., two CORESET IDs) associated with a search space or a bitmap. The time durations of the two CORESETs can be different. For example, one time duration is longer and the other time duration is shorter. For a first CORESET starting symbol, the UE determines one CORESET configuration from the two CORESET configurations according to a distance or interval between the first CORESET starting symbol and a second CORESET starting symbol. The second CORESET starting symbol could be a next CORESET starting symbol in a bitmap after the first CORESET starting symbol.

In another alternative, the UE determines a CORESET configuration with longer time duration if the distance or the interval between the first CORESET starting symbol and the second CORESET starting symbol is longer than a number. Alternative, the UE determines a CORESET configuration with shorter time duration if the distance or the interval between the first CORESET starting symbol and the second CORESET starting symbol is shorter than a number. The number could be the longer time duration minus 1. Alternatively, the number could be the longer time duration.

The bitmap is associated with the first CORESET configuration and the second CORESET configuration. For example, when a UE is configured with a first CORESET with time duration 2, a second CORESET with time duration 1 and a bit map "11100101000000", the UE monitors the CORESET for the following symbols in a slot: $\{1^{st}$ symbol$\}$, $\{2^{nd}$ symbol$\}$, $\{3^{rd}$ symbol$\}$, $\{6^{th}$ symbol, $7^{th}$ symbol$\}$ and $\{8^{th}$ symbol, $9^{th}$ symbol$\}$. For the CORESET in $\{1^{st}$ symbol$\}$, $\{2^{nd}$ symbol$\}$, $\{3^{rd}$ symbol$\}$, the configuration of the second CORESET is applied. For the CORESET in $\{6^{th}$ symbol, $7^{th}$ symbol$\}$ and $\{8^{th}$ symbol, $9^{th}$ symbol$\}$, the configuration of the second CORESET is applied.

The UE can be configured with two CORESET time durations for a given CORESET, search space, or bitmap. In one example, one CORESET time duration is longer and the other is shorter.

For a first CORESET starting symbol, the UE determines one CORESET time duration from the two configured CORESET time durations according to a distance or interval between the first CORESET starting symbol and a second CORESET starting symbol. Alternatively, the second CORESET starting symbol could be a next CORESET starting symbol in a bitmap after the first CORESET starting symbol. In one method, the UE determines a longer CORESET time duration if the distance or the interval between the first CORESET starting symbol and the second CORESET starting symbol is longer than a number. Alternatively, the UE determines a shorter CORESET time duration if the distance or the interval between the first CORESET starting symbol and the second CORESET starting symbol is shorter than a number.

The number could be the longer time duration. Alternatively, the number could be the longer time duration minus 1. The bitmap is associated with a CORESET whose configured time duration is the first CORESET time duration and the second CORESET time duration. For example, when a UE is configured with a first CORESET with time duration 1 and 2, and a bit map "11100101000000", the UE monitors the CORESET for the following symbols in a slot: $\{1^{st}$ symbol$\}$, $\{2^{nd}$ symbol$\}$, $\{3^{rd}$ symbol$\}$, $\{6^{th}$ symbol, $7^{th}$ symbol$\}$ and $\{8^{th}$ symbol, $9^{th}$ symbol$\}$. For the CORESET in $\{1^{st}$ symbol$\}$, $\{2^{nd}$ symbol$\}$, $\{3^{rd}$ symbol$\}$, the CORESET time duration of 1 is applied. For the CORESET in $\{6^{th}$ symbol, $7^{th}$ symbol$\}$ and $\{8^{th}$ symbol, $9^{th}$ symbol$\}$, the CORESET time duration 2 is applied.

The UE can be configured with a default CORESET, which is different from the CORESET indicated by the signal. The time duration of the default CORESET may be shorter than or equal to the duration indicated by the signal. More specifically, the time duration of the default CORESET can be one or two. The time duration of the default CORESET is the interval between the first bit position and the second bit position. The UE may monitor the CORESET on the OFDM symbol(s) in a slot based on the bit map excluding the first bit position and/or the second bit position. The UE may monitor the default CORESET on OFDM symbol(s) in the slot based on the first bit position and/or the second bit position.

Alternatively, the bit map can indicate at least a monitoring occasion for the CORESET by indicating a starting OFDM symbol following contiguous OFDM symbol(s) until the time duration of the CORESET is reached. The UE may interpret the bit map based on the time duration of the CORESET. For example, when a UE is configured with time duration 2 and a bit map "11011000000000", the UE monitors the CORESET for the following symbols in a slot: $\{1^{st}$ symbol, $2^{nd}$ symbol$\}$ and $\{4^{th}$ symbol, $5^{th}$ symbol$\}$. Different monitoring occasions for the CORESET indicated by the bit map can be separated by at least one bit position indicating the value 0. If the bit map indicates a number of contiguous bit position(s) with the value 1, which is a number is smaller than the time duration of the CORESET, the UE may interpret the number of contiguous bit position(s) with the value 1 indicating a monitoring occasion for the CORESET with the time duration as the number. For example, when a UE is configured with time duration 3 and a bit map "11000101011100", the UE monitors the CORESET for the following symbols in a slot: {1$^{st}$ symbol, 2$^{nd}$ symbol}, {6$^{th}$ symbol}, {8$^{th}$ symbol}, and {10$^{th}$ symbol, 11$^{th}$ symbol, 12$^{th}$ symbol}. In this example, the UE may interpret the number of contiguous bit position(s) indicating the value 1 in the bit map which is smaller than the time duration 3 as a CORESET monitoring occasion with the time duration as the contiguous number of value 1.

If bit map indicates a number of contiguous bit position(s) with the value 1, which is the number is larger than the time duration of the CORESET, the UE may interpret the number of contiguous bit position(s) with value 1 as contiguous monitoring occasions for the CORESET with the time duration or smaller than the time duration. More specifically, if the number of contiguous bit position(s) indicating the value 1 is multiple of the time duration of the CORESET, the UE may interpret the number of contiguous bit position(s) with the value 1 as contiguous monitoring occasion(s) for the CORESET for the time duration.

If the number of contiguous bit position(s) indicating the value 1 is not a multiple of the time duration of the CORESET, the UE may interpret the number of contiguous bit position(s) with the value 1 as those earlier contiguous bit(s) indicating contiguous monitoring occasion(s) for the CORESET for the time duration and the last orphan bit(s) indicating a monitoring occasion for the CORESET for the time duration smaller than the time duration of the CORESET which depends on number of last orphan bit(s).

Alternatively, the last orphan bit(s) in the number of contiguous bit(s) with the value one can be ignored by the UE. For example, when a UE is configured with a time duration 2 and a bit map "111110000000000", the UE monitors the CORESET for the following symbols in a slot: {1$^{st}$ symbol, 2$^{nd}$ symbol}, {3$^{rd}$ symbol, 4$^{th}$ symbol}. In another example, when a UE is configured with time duration 2 and a bit map "11100000000000", the UE monitors the CORESET for the following symbols in a slot: {1$^{st}$ symbol, 2$^{nd}$ symbol}, {3$^{rd}$ symbol}. In a similar example, when a UE is configured with a time duration 2 and a bit map "11100000000000", the UE monitors the CORESET for the following symbols in a slot: {1$^{st}$ symbol, 2$^{nd}$ symbol}. In this example, the UE ignores the {3$^{rd}$ symbol} indicated by the bit map.

In one embodiment, a UE is configured with a CORESET. Alternatively, the UE receives a signal indicating configuration of a CORESET. The configuration of the CORESET includes at least the time duration of the CORESET and a bit map. The bit map includes 14 bits. A set of bit position(s) in the bit map have a value of one. The set of bit position(s) indicates the starting OFDM symbol(s) in a slot for monitoring the CORESET. The interval (or distance) between each bit position (indicating the value of one) in the set (or bitmap) and the least significant bit in the bit map is larger than or equal to a number. The interval (or distance) between the last bit position (indicating the value one) in the set (or bitmap) and the least significant bit in the bit map is larger than or equal to a number. An interval or distance between two bit positions is the number of bits between the two bit positions. The two bit positions could be neglected when calculating the interval or distance. For example, an interval or distance between two bit position indicating the value 1 for a bitmap "10001000000000" is 3. Alternatively, an interval or distance between two bit positions could be the difference of the two bit positions.

In one embodiment, the number is a time duration of the CORESET. Alternatively, the number is time duration of the CORESET minus one. Alternatively, the number is the maximum time duration of the CORESET minus one. Alternatively, the number is the maximum time duration of the CORESET minus one. For example, if time duration of a CORESET is configured as 2, a bit map of a CORESET has a restriction that the interval between each bit position in the set and the least significant bit in the bit map is larger than or equal to 2 minus 1 (e.g., the bit map is 00000000000010).

In another example, the UE does not expect to receive a configuration of a bit map such that the interval (or distance) between each bit position indicating 1 in the bit map and the least significant bit in the bit map (or between the last bit indicating 1 in the bitmap and the least significant bit in the bit map) is smaller than the number (e.g., the bit map is 00000000000001).

The UE could ignore a configuration of a bit map such that the interval (or distance) between each bit position indicating 1 in the bit map and the least significant bit in the bit map (or between the last bit indicating 1 in the bitmap and the least significant bit in the bit map) is smaller than the number (e.g., the bit map is 00000000000001). The UE could ignore a part of a bit map such that the interval (or distance) between the bit position indicating 1 in the part of the bit map and the least significant bit in the bit map (or between the last bit indicating 1 in the bitmap and the least significant bit in the bit map) is smaller than the number (e.g., the bit map is 10000000000001 in which the UE applies the first 1 and ignore the last 1).

In another example, the UE does not apply a configuration of a bit map such that the interval (or distance) between each bit position indicating 1 in the bit map and the least significant bit in the bit map (or between the last bit indicating 1 in the bitmap and the least significant bit in the bit map) is smaller than the number (e.g., the bit map is 00000000000001).

A base station does not configure a UE with a bit map such that the interval (or distance) between each bit position indicating 1 in the bit map and the least significant bit in the bit map (or between the last bit indicating 1 in the bitmap and the least significant bit in the bit map) is smaller than the number (e.g., the bit map is 00000000000001). The most significant bit in the bit map represents the first OFDM symbol in a slot. The least significant bit in the bit map represents the last OFDM symbol in a slot. The signal could be PDCCH-Config. The bitmap could be monitoringSymbolsWithinSlot. The time duration could be a CORESET-time-duration. The UE may monitor the CORESET on OFDM symbol(s) in a slot based on the signal. The UE may monitor the CORESET on OFDM symbol(s) starting from each bit position in the set in a slot.

If the bit map indicates a number of contiguous bit position(s) with the value 1, which the number is larger than the time duration of the CORESET, the UE may interpret the number of contiguous bit position(s) with the value 1 as contiguous monitoring occasions for the CORESET with the time duration or smaller than the time duration. More specifically, if the number of contiguous bit position(s) indicating value 1 is a multiple of the time duration of the CORESET, the UE may interpret the number of contiguous bit position(s) with value 1 as contiguous monitoring occasion(s) for the CORESET for the time duration.

If the number of contiguous bit position(s) indicating value 1 is not a multiple of the time duration of the CORESET, the UE may interpret the number of contiguous bit position(s) with the value 1 as those earlier contiguous bit(s) indicating contiguous monitoring occasion(s) for the CORESET with the time duration, and the last orphan bit(s) indicating a monitoring occasion for the CORESET with the time duration smaller than the time duration of the CORESET which depends on number of last orphan bit(s).

Alternatively, the last orphan bit(s) in the number of contiguous bit(s) with the value one can be ignored by the UE. For example, when a UE is configured with a time duration 2 and a bit map "11110000000000", the UE monitors the CORESET for the following symbols in a slot: {$1^{st}$ symbol, $2^{nd}$ symbol}, {$3^{rd}$ symbol, $4^{th}$ symbol}. In another example, when a UE is configured with a time duration 2 and a bit map "11100000000000", the UE monitors the CORESET for the following symbols in a slot: {$1^{st}$ symbol, $2^{nd}$ symbol}, {$3^{rd}$ symbol}. In a similar example, when a UE is configured with a time duration 2 and a bit map "11100000000000", the UE monitors the CORESET for the following symbols in a slot: {$1^{st}$ symbol, $2^{nd}$ symbol}. In this example, the UE ignores {$3^{rd}$ symbol} indicated by the bit map.

Alternatively, if a bit map indicates a number of contiguous bit position(s) with the value 1, which is the number larger than the time duration of the CORESET, the UE may interpret the number of contiguous bit position(s) with the value 1 as at least a monitoring occasion for CORESET which the time duration of the CORESET is the number of contiguous bit position(s) with the value 1. For example, when a UE is configured with time duration 2 and a bit map "11100110000000", the UE monitors the CORESET for the following symbols in a slot: {$1^{st}$ symbol, $2^{nd}$ symbol, $3^{rd}$ symbol}, {$5^{th}$ symbol, $6^{th}$ symbol}. Alternatively, if a bit map indicates a number of contiguous bit position(s) with the value 1, in which the number is larger than the time duration of the CORESET, the UE may interpret the number of contiguous bit position(s) with the value 1 as at least a monitoring occasion for CORESET in which the time duration of the CORESET is the maximum time duration of a CORESET. For example, when a UE is configured with time duration 2 and a bit map "11110000000000", the UE monitors CORESET in the following symbols in a slot: {$1^{st}$ symbol, $2^{nd}$ symbol, $3^{rd}$ symbol}, {$4^{th}$ symbol} when maximum time duration of CORESET is 3.

Alternatively, the signal indicates at least a bit map. The UE may receive a PDCCH on the OFDM symbol(s) in a slot based on the bit map. The bit map indicates at least a bit position and/or at least on a contiguous bit position(s) as value one. The UE may monitor a CORESET on the OFDM symbol(s) in a slot based on the bit map. The UE may view the contiguous bit position(s) as a CORESET. The UE may not expect to have the bit map indicating the number of the contiguous bit position(s) with the value one exceeding a maximum time duration for a CORESET. Alternatively, if the UE receives the bit map indicating the number of the contiguous bit position(s) with the value one exceeding a maximum time duration for a CORESET, the UE may ignore part of the indication of the bit map. Alternatively, the UE may ignore the whole indication of the bit map. For example, when a UE is configured with a bit map "11010111000000", the UE monitors the CORESET for the following symbols in a slot: {$1^{st}$ symbol, $2^{nd}$ symbol}, {$4^{th}$ symbol}, {$6^{th}$ symbol, $7^{th}$ symbol, $8^{th}$ symbol} when the maximum time duration of CORESET is 3. In a similar example, when a UE is configured with a bit map "11100001100000", the UE may ignore the first three 1's because it will exceed the maximum time duration if the maximum time duration of the CORESET is 2. In the above example, the UE may monitor the CORESET for the following symbols in a slot: {$8^{th}$ symbol, $9^{th}$ symbol}. The time duration of a CORESET can be determined based on the bit map and each contiguous bit position(s) with the value one in the bit map. The signal does not indicate the time duration for a CORESET. The signal indicates different configurations for the different time duration CORESET(s). The configuration may include at least CCE-REG mapping, aggregation level, search space configuration, and frequency resource assignment.

In another embodiment, a UE is configured with a CORESET. Alternatively, the UE receives a signal indicating a configuration of a CORESET. The configuration of the CORESET includes at least a time duration of the CORESET and a bit map. The bit map includes 14 bits. A set of bit position(s) in the bit map have a value of one. The set of bit position(s) indicates the starting OFDM symbol(s) in a slot for monitoring the CORESET. The interval (or distance) between a bit position in the set and the least significant bit in the bit map is smaller than a number. The interval (or distance) between the last bit position indicating a value of 1 in the bit map and the least significant bit in the bit map is smaller than a number. An interval or distance between two bit positions is a number of bits between the two bit positions. The two bit positions could be neglected when calculating the interval or distance. For example, an interval or distance between two bit positions indicating the value 1 for a bitmap "10001000000000" is 3.

More specifically, the number is a time duration of the CORESET. Alternatively, the number is a time duration of the CORESET minus one. Alternatively, the number is a maximum time duration of the CORESET minus one. Alternatively, the number is a maximum time duration of the CORESET minus one. For example, if the time duration of a CORESET is configured as 2, a bit map of a CORESET may be 00000000000001. The most significant bit in the bit map represents the first OFDM symbol in a slot. The least significant bit in the bit map represents the last OFDM symbol in a slot. The signal could be a PDCCH-Config. The bitmap could be monitoringSymbolsWithinSlot.

The time duration could be a CORESET-time-duration. The UE may monitor the CORESET on the OFDM symbol(s) in a slot based on the signal. The UE may monitor the CORESET on the OFDM symbol(s) starting from each bit position in the set in a slot. The UE may monitor the CORESET on the OFDM symbol(s) in a slot based on the bit map excluding the bit position. The UE may not expect to monitor the CORESET on OFDM symbol(s) in a slot starting from the bit position. The UE may be configured with a default CORESET, which is different from the CORESET indicated by the signal. The time duration of the default CORESET may be shorter than or equal to the duration indicated by the signal. The time duration of the default CORESET may be one or two. The time duration of the default CORESET is the interval between the bit position and the least significant bit in the bit map. The UE may monitor the CORESET on the OFDM symbol(s) in a slot based on the bit map excluding the bit position. The UE may monitor the default CORESET on the OFDM symbol(s) in the slot based on the bit position.

The UE can be configured with two CORESETs (e.g., two CORESET IDs) associated with a search space or a bitmap. The time durations of the two CORESETs can be different. For example, a first duration is longer and a second duration is shorter. For a first CORESET starting symbol, the UE determines one CORESET configuration from the two CORESET configurations according to a distance or interval between the first CORESET starting symbol and the last symbol in a slot. The UE determines a CORESET configuration for the longer time duration if the distance or the interval between the first CORESET starting symbol and the last symbol in a slot is longer than a number. The UE determines a CORESET configuration for the shorter time duration if the distance or the interval between the first CORESET starting symbol and the last symbol in a slot is shorter than a number. The number could be the longer time duration minus 1. The number could be the longer time duration.

In one embodiment, the bitmap is associated with the first CORESET configuration and the second CORESET configuration. For example, when a UE is configured with a first CORESET with a time duration of 2, a second CORESET with a time duration of 1 and a bit map "00000101000001", the UE monitors the CORESET for the following symbols in a slot: $\{6^{th}$ symbol, $7^{th}$ symbol$\}$, $\{8^{th}$ symbol, $9^{th}$ symbol$\}$ and $\{14^{th}$ symbol$\}$. For the CORESET in $\{14^{th}$ symbol$\}$, the configuration of the second CORESET is applied. For the CORESET in $\{6^{th}$ symbol, $7^{th}$ symbol$\}$ and $\{8^{th}$ symbol, $9^{th}$ symbol$\}$, the configuration of the second CORESET is applied.

The UE can be configured with two CORESET time durations for a given CORESET, a search space, or a bitmap. For example, one CORESET time duration is longer and the other time duration is shorter. For a first CORESET starting symbol, the UE determines one CORESET time duration from the two configured CORESET time durations according to a distance or interval between the first CORESET starting symbol and the last symbol in a slot. The UE determines the longer CORESET time duration if the distance or the interval between the first CORESET starting symbol and the last symbol in a slot is longer than a number. The UE determines the shorter CORESET time duration if the distance or the interval between the first CORESET starting symbol and the last symbol in a slot is shorter than a number. The number could be the longer time duration minus 1. Alternatively, the number could be the longer time duration. The bitmap is associated with a CORESET whose configured time duration is the first CORESET time duration and the second CORESET time duration. For example, when a UE is configured with a first CORESET with a time duration of 1 and 2 and a bit map "00000101000001", the UE monitors the CORESET for the following symbols in a slot: $\{6^{th}$ symbol, $7^{th}$ symbol$\}$, $\{8^{th}$ symbol, $9^{th}$ symbol$\}$ and $\{14^{th}$ symbol$\}$. For the CORESET in $\{14^{th}$ symbol$\}$, the CORESET time duration of 1 is applied. For the CORESET in $\{6th$ symbol, $7^{th}$ symbol$\}$ and $\{8^{th}$ symbol, $9^{th}$ symbol$\}$, the CORESET time duration of 2 is applied. Alternatively, the OFDM symbols for a CORESET could span different slots. A CORESET could span a first slot and a second slot if the interval or distance between the last bit position indicating 1 in the first slot and the last symbol in the first slot is shorter than the number. The second slot is the next slot of the first slot. For example, when a UE is configured with a time duration 2 and a bit map "10000101000001", the UE monitors the CORESET for the following symbols in a slot: $\{1^{st}$ symbol, $2^{nd}$ symbol$\}$, $\{6^{th}$ symbol, $7^{th}$ symbol$\}$, $\{8^{th}$ symbol, $9^{th}$ symbol$\}$ and $\{14^{th}$ symbol, $1^{st}$ symbol of the next slot$\}$. Alternatively, the CORESET time duration of CORESETs associated with a bitmap within a slot could be different. Alternatively, the CORESET time duration could be different from the configured value if the interval or distance between the last bit position indicating 1 in the first slot and the last symbol in the first slot is shorter than the number. For example, when a UE is configured with a time duration 2 and a bit map "10000101000001", the UE monitors the CORESET for the following symbols in a slot: $\{1^{st}$ symbol, $2^{nd}$ symbol$\}$, $\{6^{th}$ symbol, $7^{th}$ symbol$\}$, $\{8^{th}$ symbol, $9^{th}$ symbol$\}$ and $\{14^{th}$ symbol$\}$. It can be observed that the CORESETs corresponding to the last bit in the bitmap have 1 symbol time duration even if the configured value is 2 due to the short interval or distance to the last symbol of a slot.

Alternatively, if a bit map indicates a number of contiguous bit position(s) with value 1, in which the number is larger than the time duration of the CORESET, the UE may interpret the number of contiguous bit position(s) with the value 1 as at least a monitoring occasion for the CORESET, in which the time duration of the CORESET is the number of contiguous bit position(s) with value 1. For example, when a UE is configured with a time duration 2 and a bit map "11100110000000", the UE monitors the CORESET for the following symbols in a slot: $\{1^{st}$ symbol, $2^{nd}$ symbol, $3^{rd}$ symbol$\}$, $\{5^{th}$ symbol, $6^{th}$ symbol$\}$. Alternatively, if bit map indicates a number of contiguous bit position(s) with value 1, in which the number is larger than the time duration of the CORESET, the UE may interpret the number of contiguous bit position(s) with the value 1 as at least a monitoring occasion for the CORESET, in which the time duration of the CORESET is the maximum time duration of a CORESET. For example, when a UE is configured with a time duration 2 and a bit map "11110000000000", the UE monitors the CORESET for the following symbols in a slot: $\{1^{st}$ symbol, $2^{nd}$ symbol, $3^{rd}$ symbol$\}$, $\{4^{th}$ symbol$\}$ when the maximum time duration of the CORESET is 3.

Alternatively, the signal indicates at least a bit map. The UE may receive a PDCCH on the OFDM symbol(s) in a slot based on the bit map. The bit map indicate at least a bit position and/or at least one contiguous bit position(s) as value one. The UE may monitor a CORESET on the OFDM symbol(s) in a slot based on the bit map. The UE may view the contiguous bit position(s) as a CORESET. The UE may not expect to have the bit map indicating number of the contiguous bit position(s) with value one exceeding a maximum time duration for a CORESET. Alternatively, if the UE receives the bit map indicating the number of the contiguous bit position(s) with value one exceeding a maximum time duration for a CORESET, the UE may ignore a part of the indication of the bit map. Alternatively, the UE may ignore the whole indication of the bit map. For example, when a UE is configured with a bit map "11010111000000", the UE monitors the CORESET for the following symbols in a slot: $\{1^{st}$ symbol, $2^{nd}$ symbol$\}$, $\{4^{th}$ symbol$\}$, $\{6^{th}$ symbol, $7^{th}$ symbol, $8^{th}$ symbol$\}$ when the maximum time duration of CORESET is 3. In a similar example, when a UE is configured with a bit map "11100001100000", the UE may ignore the first three 1's because it will exceed the maximum time duration if the maximum time duration of CORESET is 2. In the above example, the UE may monitor the CORESET for the following symbols in a slot: $\{8^{th}$ symbol, $9^{th}$ symbol$\}$. The time duration of a CORESET can be determined based on the bit map and each contiguous bit position(s) with value one in the bit map. The signal does not indicate a time duration for a CORESET. The signal indicates the different configurations for different time duration CORESET(s). The configuration may include at least a CCE-REG mapping, aggregation level, search space configuration, or frequency resource assignment.

According to one method, the UE receives a signal indicating at least a duration and a bit map, wherein a set of bit position(s) in the bit map indicates a value, and wherein an interval between each bit position in the set is larger than or equal to a number.

According to another method, the network transmits a signal indicating at least a duration and a bit map, wherein a set of bit position(s) in the bit map indicates a value, wherein interval between each bit position in the set is larger than or equal to a number.

In one or more of the above-disclosed methods, the value is one.

In one or more of the above-disclosed methods, the number is the duration.

In one or more of the above-disclosed methods, the number is the duration minus one.

In one or more of the above-disclosed methods, the number is maximum duration, wherein the maximum duration is maximum time duration of a control resource set (CORESET).

In one or more of the above-disclosed methods, the number is maximum duration minus one, wherein the maximum duration is maximum time duration of a CORESET.

In one or more of the above-disclosed methods, the duration is a time duration of a CORESET.

In one or more of the above-disclosed methods, the bit map comprises 14 bits.

In one or more of the above-disclosed methods, the set of bit position(s) in the bit map indicates monitoring starting OFDM symbol(s) of a CORESET in a slot.

In one or more of the above-disclosed methods, the most significant bit in the bit map represents the first OFDM symbol in a slot.

In one or more of the above-disclosed methods, the least significant bit in the bit map represents the last OFDM symbol in a slot.

In one or more of the above-disclosed methods, the signal indicates configuration of a CORESET.

In one or more of the above-disclosed methods, the signal is a PDCCH-config IE which is used to configure UE-specific PDCCH parameters.

In one or more of the above-disclosed methods, the UE monitors a CORESET based on the signal.

In one or more of the above-disclosed methods, the UE monitors a CORESET on OFDM symbol(s) in a slot based on the bit map.

In one or more of the above-disclosed methods, the UE monitors a CORESET on OFDM symbol(s) in a slot starting from each bit position in the set.

According to one method, the UE receives a signal indicating at least a duration and a bit map, wherein interval between a pair of bit position(s) indicating a value in the bit map is smaller than the duration.

According to one method, the network transmits a signal indicating at least a duration and a bit map, wherein interval between a pair of bit position(s) indicating a value in the bit map is smaller than the duration.

In one or more of the above-disclosed methods, the pair of bit position(s) comprises a first bit position and a second bit position.

In one or more of the above-disclosed methods, the first bit position is closer to the most significant bit in the bit map than the second bit position.

In one or more of the above-disclosed methods, the value is one.

In one or more of the above-disclosed methods, the duration is a time duration of a CORESET.

In one or more of the above-disclosed methods, the bit map comprises 14 bits.

In one or more of the above-disclosed methods, the most significant bit in the bit map represents the first OFDM symbol in a slot.

In one or more of the above-disclosed methods, the least significant bit in the bit map represents the last OFDM symbol in a slot.

In one or more of the above-disclosed methods, the signal indicates configuration of a CORESET.

In one or more of the above-disclosed methods, the signal is a PDCCH-config IE which is used to configure UE-specific PDCCH parameters.

In one or more of the above-disclosed methods, the UE monitors a CORESET based on the signal.

In one or more of the above-disclosed methods, the UE monitors a CORESET on OFDM symbol(s) in a slot based on the bit map.

In one or more of the above-disclosed methods, the UE monitors a CORESET on OFDM symbol(s) in a slot starting from bit position(s) in the bit map indicating the value.

In one or more of the above-disclosed methods, the UE monitors a CORESET on OFDM symbol(s) in a slot starting from bit position(s) in the bit map indicating the value excluding the pair of bit position.

In one or more of the above-disclosed methods, the UE monitors a CORESET on OFDM symbol(s) in a slot starting from bit position(s) in the bit map indicating the value excluding the first bit position of the pair.

In one or more of the above-disclosed methods, the UE monitors a CORESET on OFDM symbol(s) in a slot starting from bit position(s) in the bit map indicating the value excluding the second bit position of the pair.

In one or more of the above-disclosed methods, the UE ignores the signal.

In one or more of the above-disclosed methods, the UE transmits a Negative Acknowledgement (NACK) as a feedback of the signal.

In one or more of the above-disclosed methods, the UE monitors a CORESET on OFDM symbol(s) in an even slot based on the bit map excluding the second bit position of the pair.

In one or more of the above-disclosed methods, the UE monitors a CORESET on OFDM symbol(s) in an odd slot based on the bit map excluding the second bit position of the pair.

In one or more of the above-disclosed methods, the UE monitors a CORESET on OFDM symbol(s) in an even slot based on the bit map excluding the first bit position of the pair.

In one or more of the above-disclosed methods, the signal comprises a pattern for indicating the bit map.

In one or more of the above-disclosed methods, the pattern indicates a slot level bit map.

In one or more of the above-disclosed methods, if bit position of the slot level bit map indicates one, the UE monitors a CORESET in a slot based on the bit map excluding the second bit position of the pair.

In one or more of the above-disclosed methods, if bit position of the slot level bit map indicates one, the UE monitors a CORESET in a slot based on the bit map excluding the first bit position of the pair.

In one or more of the above-disclosed methods, the UE monitors a CORESET in a slot based on the bit map and slot format of the slot.

In one or more of the above-disclosed methods, if the slot format of the slot indicates a set of OFDM symbol(s) as flexible or uplink which the set comprises part of OFDM symbols which start from the first bit position with the duration, the UE monitors a CORESET based on the bit map excluding the first bit position of the pair.

In one or more of the above-disclosed methods, if the slot format of the slot indicates a set of OFDM symbol(s) as flexible or uplink which the set comprises part of OFDM symbols which start from the second bit position with the duration, the UE monitors a CORESET based on the bit map excluding the second bit position of the pair.

In one or more of the above-disclosed methods, the UE is configured with a default CORESET, which is different from a CORESET indicated by the signal.

In one or more of the above-disclosed methods, the time duration of the default CORESET is shorter than the duration.

In one or more of the above-disclosed methods, the time duration of the default CORESET is one or two.

In one or more of the above-disclosed methods, the time duration of the default CORESET is the interval between the first bit position and the second bit position of the pair.

In one or more of the above-disclosed methods, the UE monitors the CORESET on OFDM symbol(s) in a slot based on the bit map excluding the pair of bit position(s) and monitors the default CORESET on OFDM symbol(s) in the slot based on the pair of bit position(s).

According to another method, the UE receives a signal indicating at least a duration and a bit map, wherein a set of bit position indicates a value in the bit map, and wherein an interval between every bit position in the set and the least significant bit in the bit map is larger than or equal to a number.

According to another method, the network transmits a signal indicating at least a duration and a bit map, wherein a set of bit position indicates a value in the bit map, and wherein an interval between a bit position in the set and the least significant bit in the bit map is larger than or equal to a number.

In one or more of the above-disclosed methods, the value is one.

In one or more of the above-disclosed methods, the number is the duration.

In one or more of the above-disclosed methods, the number is the duration minus one.

In one or more of the above-disclosed methods, the number is a maximum duration, wherein the maximum duration is maximum time duration of a CORESET.

In one or more of the above-disclosed methods, the number is a maximum duration minus one, wherein the maximum duration is a maximum time duration of a CORESET.

In one or more of the above-disclosed methods, the duration is a time duration of a CORESET.

In one or more of the above-disclosed methods, the bit map comprises 14 bits.

In one or more of the above-disclosed methods, the set of bit position(s) in the bit map indicates monitoring starting OFDM symbol(s) of a CORESET in a slot.

In one or more of the above-disclosed methods, the most significant bit in the bit map represents the first OFDM symbol in a slot.

In one or more of the above-disclosed methods, the least significant bit in the bit map represents the last OFDM symbol in a slot.

In one or more of the above-disclosed methods, the signal indicates a configuration of a CORESET.

In one or more of the above-disclosed methods, the signal is a PDCCH-config IE which is used to configure UE-specific PDCCH parameters.

In one or more of the above-disclosed methods, the UE monitors a CORESET based on the signal.

In one or more of the above-disclosed methods, the UE monitors a CORESET on OFDM symbol(s) in a slot based on the bit map.

In one or more of the above-disclosed methods, the UE monitors a CORESET on OFDM symbol(s) in a slot starting from each bit position in the set.

According to another method, the UE receives a signal indicating at least a duration and a bit map, wherein a set of bit position(s) indicates a value in the bit map, and wherein an interval between a bit position in the set and the least significant bit in the bit map is smaller than the duration.

In one or more of the above-disclosed methods, the value is one.

In one or more of the above-disclosed methods, the duration is a time duration of a CORESET.

In one or more of the above-disclosed methods, the bit map comprises 14 bits.

In one or more of the above-disclosed methods, the most significant bit in the bit map represents the first OFDM symbol in a slot.

In one or more of the above-disclosed methods, the least significant bit in the bit map represents the last OFDM symbol in a slot.

In one or more of the above-disclosed methods, the signal indicates a configuration of a CORESET.

In one or more of the above-disclosed methods, the signal is a PDCCH-config IE which is used to configure UE-specific PDCCH parameters.

In one or more of the above-disclosed methods, the UE monitors a CORESET based on the signal.

In one or more of the above-disclosed methods, the UE monitors a CORESET on OFDM symbol(s) in a slot based on the bit map.

In one or more of the above-disclosed methods, the UE monitors a CORESET on OFDM symbol(s) in a slot based on the bit map excluding the bit position.

In one or more of the above-disclosed methods, the UE does not monitor a CORESET on OFDM symbol(s) in a slot starting from the bit position.

In one or more of the above-disclosed methods, the UE is configured with a default CORESET, which is different from a CORESET indicated by the signal.

In one or more of the above-disclosed methods, the time duration of the default CORESET is shorter than the duration indicated by the signal.

In one or more of the above-disclosed methods, the time duration of the default CORESET is one or two.

In one or more of the above-disclosed methods, the time duration of the default CORESET is the interval between the bit position and the least significant bit in the bit map.

In one or more of the above-disclosed methods, the UE monitors the CORESET on OFDM symbol(s) in a slot based on the bit map excluding the bit position and monitors the default CORESET on OFDM symbol(s) in the slot based on the bit position.

According to another method, the UE receives a signal indicating at least a bit map, wherein the bit map indicates at least one bit position or at least one contiguous bit position(s) with a value.

In one or more of the above-disclosed methods, the signal indicates a duration.

In one or more of the above-disclosed methods, the value is one.

In one or more of the above-disclosed methods, the duration is a time duration of a CORESET.

In one or more of the above-disclosed methods, the bit map comprises 14 bits.

In one or more of the above-disclosed methods, the most significant bit in the bit map represents the first OFDM symbol in a slot.

In one or more of the above-disclosed methods, the least significant bit in the bit map represents the last OFDM symbol in a slot.

In one or more of the above-disclosed methods, the signal indicates a configuration of a CORESET.

In one or more of the above-disclosed methods, the signal is a PDCCH-config IE which is used to configure UE-specific PDCCH parameters.

In one or more of the above-disclosed methods, the UE monitors the CORESET on OFDM symbol(s) in a slot based on the bit map.

In one or more of the above-disclosed methods, the UE monitors the CORESET on OFDM symbol(s) in a slot based on the bit map and the duration.

In one or more of the above-disclosed methods, the number of the contiguous bit position(s) with the value indicates a time duration of a CORESET.

In one or more of the above-disclosed methods, if the number of the contiguous bit position(s) with the value is equal to the duration, the UE monitors the CORESET with the duration.

In one or more of the above-disclosed methods, if number of the contiguous bit position(s) with the value is smaller than the duration, the UE monitors the CORESET with the number of the contiguous bit position(s).

In one or more of the above-disclosed methods, if number of the contiguous bit position(s) with the value is larger than the duration and the number is multiple of the duration, the UE interprets the contiguous bit position(s) with the value as contiguous occasions for monitoring the CORESET with the duration.

In one or more of the above-disclosed methods, if number of the contiguous bit position(s) with the value is larger than the duration and the number is not multiple of the duration, the UE interprets the contiguous bit position(s) with the value as at least one occasion for monitoring the CORESET with the duration and a occasion for monitoring the CORESET with time duration equal to number of orphan bit of the contiguous bit position(s).

As those skilled in the art will appreciate, the various disclosed embodiments may be combined to form new embodiments and/or methods.

Figure 7:
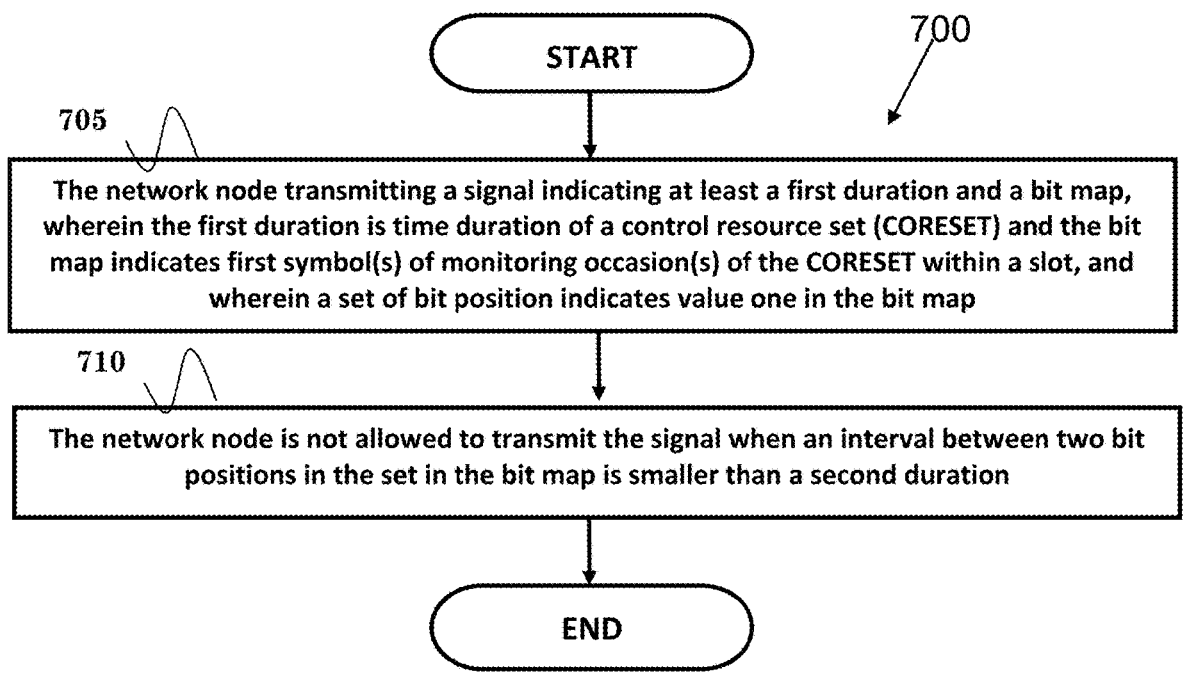
FIG. 7 is a flow diagram for one exemplary embodiment from the perspective of a network node.

FIG. 7 is a flow chart 700 according to one exemplary embodiment from the perspective of a network node. In step 705, the network node transmits a signal indicating at least a first duration and a bit map, wherein the first duration is time duration of a control resource set (CORESET) and the bit map indicates first symbol(s) of monitoring occasion(s) of the CORESET within a slot, and wherein a set of bit position indicates value one in the bit map. In step 710, the network node is not allowed to transmit the signal such that an interval between two bit positions in the set in the bit map is smaller than a second duration.

In one embodiment, the second duration is the first duration.

In one embodiment, the second duration is the first duration minus one.

In one embodiment, the network is not allowed to transmit the signal indicating that the first duration is 2 and the bit map is 11000000000000.

In one embodiment, the interval between two bit positions in the set in the bit map shall be larger than or equal to the second duration.

In one embodiment, the network node is not allowed to transmit the signal such that interval between a bit position in the set in the bit map and the least significant bit position in the bit map is smaller than the second duration.

In one embodiment, the interval between a bit position in the set in the bit map and the least significant bit position in the bit map shall be larger than or equal to the second duration.

In one embodiment, the network node transmits a Physical Downlink Control Channel (PDCCH) candidate on monitoring occasion(s) of the CORESET.

In one embodiment, the slot duration comprises 14 OFDM symbols.

In one embodiment, the bit map comprises 14 bits.

In one embodiment, the signal indicates the configuration of the CORESET.

In one embodiment, the signal is PDCCH-config information element.

In one embodiment, the interval is the difference between two bit positions.

In one embodiment, the interval is the number of bits between two bit positions.

Figure 8:
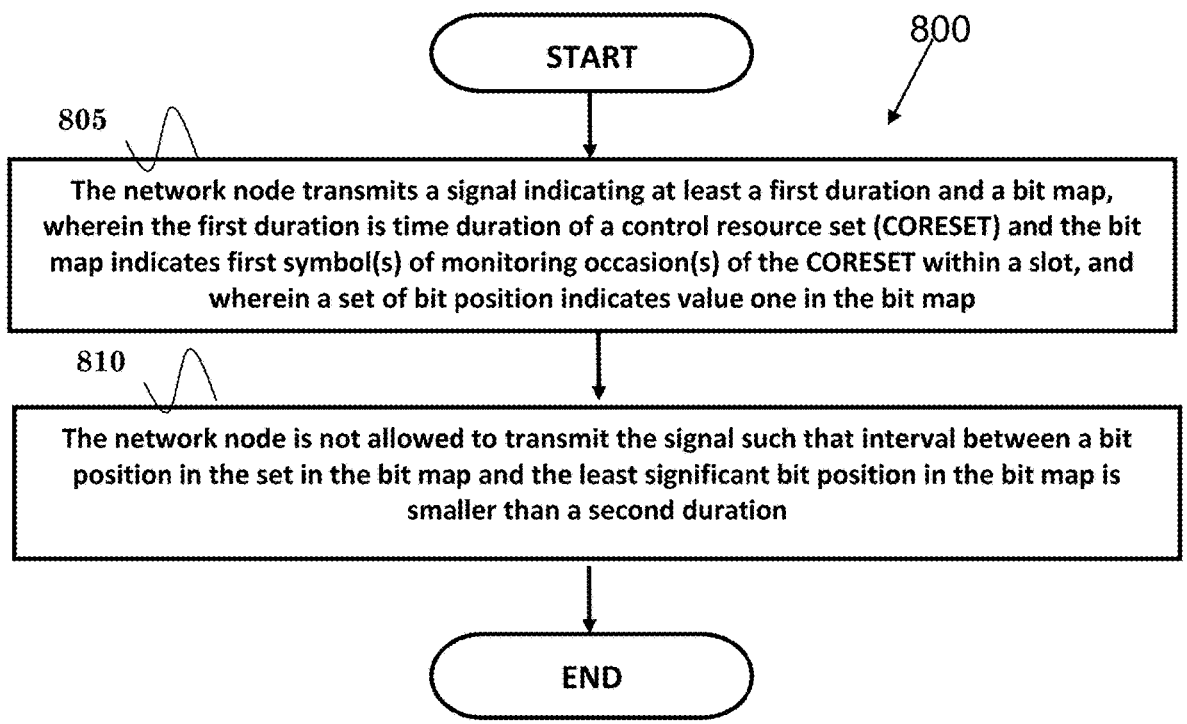
FIG. 8 is a flow diagram for one exemplary embodiment from the perspective of a network node.

FIG. 8 is a flow chart 800 according to one exemplary embodiment from the perspective of a network node. In step 805, the network node transmits a signal indicating at least a first duration and a bit map, wherein the first duration is time duration of a control resource set (CORESET) and the bit map indicates first symbol(s) of monitoring occasion(s) of the CORESET within a slot, and wherein a set of bit position indicates value one in the bit map. In step 810, the network node is not allowed to transmit the signal such that interval between a bit position in the set in the bit map and the least significant bit position in the bit map is smaller than a second duration.

In one embodiment, the second duration is the first duration.

In one embodiment, the second duration is the first duration minus one.

In one embodiment, the network is not allowed to transmit the signal indicating that the first duration is 2 and the bit map is 00000000000001.

In one embodiment, the interval between a bit position in the set in the bit map and the least significant bit position in the bit map shall be larger than or equal to the second duration.

In one embodiment, the network node is not allowed to transmit the signal such that interval between two bit positions in the set in the bit map is smaller than the second duration.

In one embodiment, the network node transmits a Physical Downlink Control Channel (PDCCH) candidate on monitoring occasion(s) of the CORESET.

In one embodiment, the slot duration comprises 14 OFDM symbols.

In one embodiment, the bit map comprises 14 bits.

In one embodiment, the signal indicates the configuration of the CORESET.

In one embodiment, the signal is PDCCH-config information element.

In one embodiment, the interval is the difference between two bit positions.

In one embodiment, the interval is the number of bits between two bit positions.

Referring back to FIGS. 3 and 4, in one embodiment, the device 300 includes a program code 312 stored in memory 310. The CPU 308 could execute program code 312 (i) to transmit a signal indicating at least a first duration and a bit map, wherein the first duration is time duration of a control resource set (CORESET) and the bit map indicates first symbol(s) of monitoring occasion(s) of the CORESET within a slot, and wherein a set of bit position indicates value one in the bit map, and (ii) is not allowed to transmit the signal such that an interval between two bit positions in the set in the bit map is smaller than a second duration.

In another aspect, the CPU 308 could execute program code 312 to (i) transmits a signal indicating at least a first duration and a bit map, wherein the first duration is time duration of a control resource set (CORESET) and the bit map indicates first symbol(s) of monitoring occasion(s) of the CORESET within a slot, and wherein a set of bit position indicates value one in the bit map, and (ii) and is not allowed to transmit the signal such that interval between a bit position in the set in the bit map and the least significant bit position in the bit map is smaller than a second duration.

Furthermore, the CPU 308 can execute the program code 312 to perform all of the above-described actions and steps or others methods described herein.

The above-disclosed methods provide a restriction of a configuration of a CORESET so that UEs can avoid handling ambiguous configurations. Additionally, the various above-disclosed methods can help UEs handle ambiguous configurations.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclo-

What is claimed is:

1. A method of a network node, comprising:
    transmitting a signal indicating at least a first time duration and a bit map, wherein each bit position of the bit map with the value of one indicates a starting Orthogonal Frequency Division Multiplexing (OFDM) symbol; and
    not allowing transmission of the signal when an interval between any two bit positions with the value of one in the bit map is smaller than the first time duration.

2. The method of claim 1, wherein the network node is not allowed to transmit the signal indicating that the first time duration is 2 and the bit map is 11000000000000.

3. The method of claim 1, wherein the interval between two bit positions shall be larger than or equal to the first time duration.

4. The method of claim 1, wherein the network node is not allowed to transmit the signal such that the interval between any bit position in the bit map and the least significant bit position in the bit map is smaller than the first time duration minus one.

5. The method of claim 1, wherein the interval between a bit position in the bit map and the least significant bit position in the bit map shall be larger than or equal to the first time duration.

6. The method of claim 1, wherein the network node transmits a Physical Downlink Control Channel (PDCCH) candidate on monitoring occasions of a control resource set (CORESET).

7. The method of claim 1, wherein the signal indicates the configuration of a CORESET.

8. The method of claim 1, wherein the signal is PDCCH-config information element.

9. The method of claim 1, wherein the interval is the difference between two bit positions.

10. The method of claim 1, wherein the interval is number of bits between two bit positions.

11. A method of a network node, comprising:
    transmitting a signal indicating at least a first time duration and a bit map, wherein each bit position of the bit map with the value of one indicates a starting Orthogonal Frequency Division Multiplexing (OFDM) symbol; and
    not allowing to transmit the signal when an interval between any bit position with the value of one in the bit map and the least significant bit position in the bit map is smaller than the first time duration minus one.

12. The method of claim 11, wherein the network node is not allowed to transmit the signal indicating that the first time duration is 2 and the bit map is 00000000000001.

13. The method of claim 11, wherein the interval between a bit position and the least significant bit position in the bit map shall be larger than or equal to the first time duration minus one.

14. The method of claim 11, wherein the network node is not allowed to transmit the signal such that the interval between any two bit positions is smaller than the first time duration.

15. The method of claim 11, wherein the network node transmits a Physical Downlink Control Channel (PDCCH) candidate on monitoring occasions of a control resource set (CORESET).

16. The method of claim 11, wherein the signal indicates the configuration of a CORESET.

17. The method of claim 11, wherein the signal is PDCCH-config information element.

18. The method of claim 11, wherein the interval is the difference between two bit positions.

19. The method of claim 11, wherein the interval is number of bits between two bit positions.

20. A network node, comprising:
    a processor; and
    a memory operatively coupled to the processor, wherein the processor is configured to execute a program code to:
        transmit a signal indicating at least a first time duration and a bit map, wherein each bit position of the bit map with the value of one indicates a starting Orthogonal Frequency Division Multiplexing (OFDM) symbol of a monitoring occasion; and
        not allowing to transmit the signal when an interval between any two bit positions with the value of one in the bit map is smaller than the first time duration.

* * * * *